United States Patent [19]

Caldara et al.

[11] Patent Number: 5,235,685
[45] Date of Patent: Aug. 10, 1993

[54] INTERFACE BUS WITH INDEPENDENT DATA, COMMAND AND DIRECT CONTROL SECTIONS FOR PARALLEL TRANSFER OF INFORMATION BETWEEN HOST AND INTELLIGENT STORAGE

[75] Inventors: Stephen A. Caldara, Sudbury, Mass.; John R. McDaniel, Rochester, N.H.; Kenneth S. Goekjian, Candia, N.H.; Donald J. Barbarits, Durham, N.H.; Salvatore Faletra, Somersworth, N.H.; John E. Shur, Stratham, N.H.

[73] Assignee: Data General Corp., Westboro, Mass.

[21] Appl. No.: 350,331

[22] Filed: May 11, 1989

[51] Int. Cl.⁵ .......................................... G06F 13/00
[52] U.S. Cl. .................. 395/325; 364/240.1; 364/260; 364/240.5; 364/935.4; 364/DIG. 1
[58] Field of Search ... 364/200 MS File, 900 MS File; 395/425, 3.25

[56] References Cited

U.S. PATENT DOCUMENTS

| | | | |
|---|---|---|---|
| 4,080,649 | 3/1978 | Calle | 364/200 |
| 4,106,092 | 8/1978 | Millers | 364/200 |
| 4,162,520 | 7/1979 | Cook | 364/200 |
| 4,354,225 | 10/1982 | Frieder | 364/200 |
| 4,682,304 | 7/1987 | Tierney | 364/900 |
| 4,747,047 | 5/1988 | Coogan | 364/200 |
| 4,805,090 | 2/1989 | Coogan | 364/200 |
| 4,839,793 | 6/1989 | Brunk | 395/425 |
| 4,853,847 | 8/1989 | Ohuchi | 395/425 |
| 4,860,734 | 9/1989 | Idleman | 364/200 |
| 4,864,532 | 9/1989 | Reeve | 364/900 |
| 4,888,691 | 12/1989 | George | 395/425 |

Primary Examiner—Thomas C. Lee
Assistant Examiner—Eric Coleman
Attorney, Agent, or Firm—Jacob Frank; Joel Wall; Irving M. Kriegsman

[57] ABSTRACT

A data processing system is disclosed in which a plurality of high performance, intelligent, mass storage input-output devices are linked to a host controller by an input-output interface bus which is divided into three sections. Each section is completely independent of the other two sections and used for a different and specific purpose. One section is used to transfer commands and retrieve status information. A second section is used to handle device requests for data transfer and device signals for operation complete. The third section is used to transfer data to and from a device. Since the three sections are completely independent, simultaneous transfer of command control and data to different input-output devices or to a single input-output device can be performed.

13 Claims, 28 Drawing Sheets

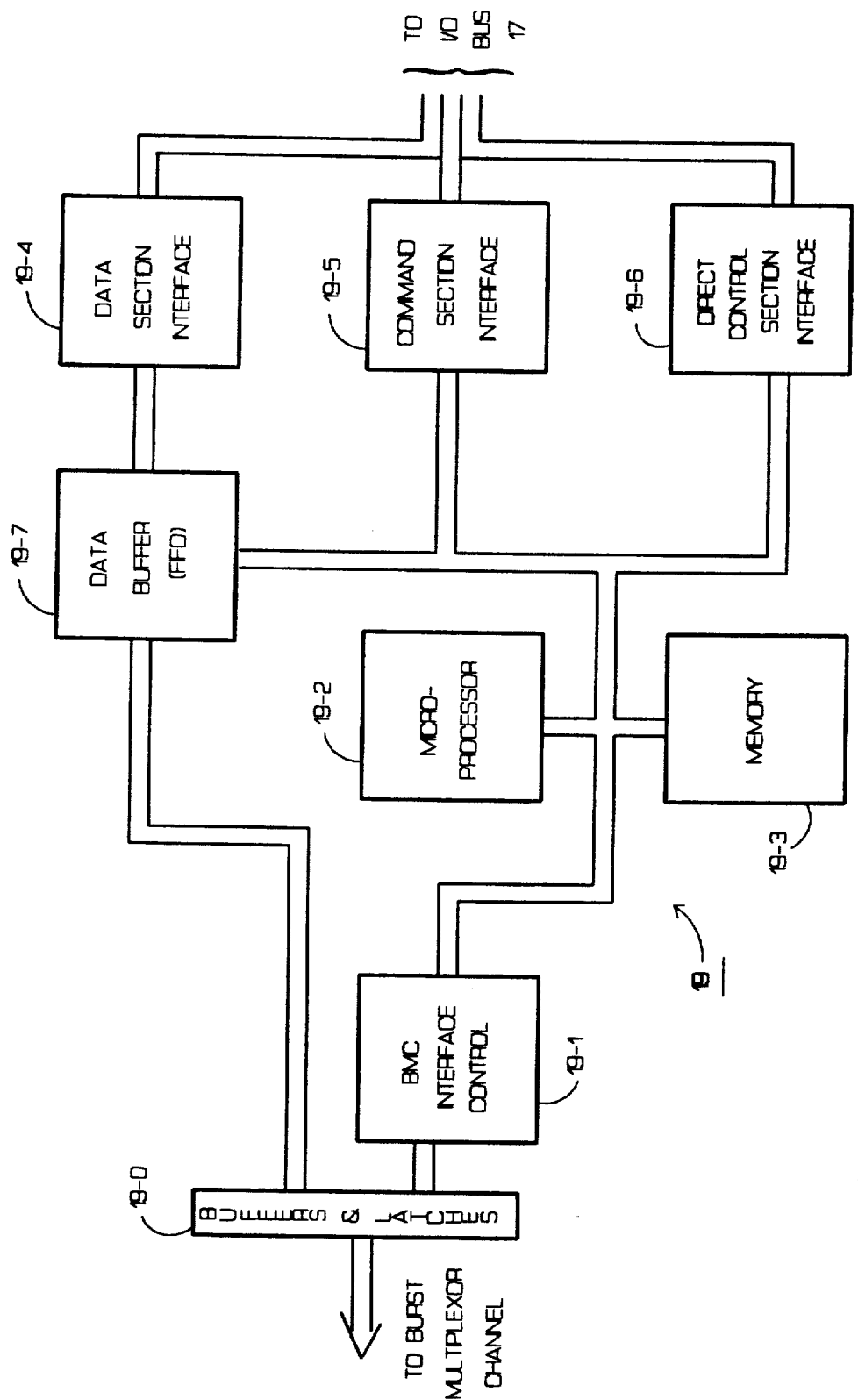

4.2.6 Control Sequence Timing

\* Notes: - Unless otherwise indicated, all times are (+/- 10 %)
 - The master device can extend all of its' times indefinitely

FIG. 12(a)

INTERFACE BUS WITH INDEPENDENT DATA, COMMAND AND DIRECT CONTROL SECTIONS FOR PARALLEL TRANSFER OF INFORMATION BETWEEN HOST AND INTELLIGENT STORAGE

BACKGROUND OF THE INVENTION

This invention pertains to a data processing system having a host computer and at least one intelligent, mass storage, input-output (I/O) device and more particularly to an input-output interface bus for interfacing the host computer in such a data processing system to such an I/O device or devices.

The invention is particularly useful with but is not exclusively limited to use with high performance type I/O devices.

As used herein, the term "high performance I/O device" means any I/O device capable of transferring significant amounts of data with some frequency (e.g. a Winchester type hard disk drive or a streaming tape drive). As also used herein, the term "intelligent I/O device" means only I/O device capable of completing an I/O operation with only minimal support from the host resident controller (e.g. any I/O device capable of supporting an SCSI interface). As also used herein, the term "mass storage I/O device" means any device capable of storing significant amounts of data for extended periods, not immediately available to the host computer, (e.g. disk drives, tape drives and ram disks) but not main memory.

In data processing systems having a host computer and one or more I/O device, the transfer of commands, data and status information between the host computer and the I/O device is normally handled through a bus commonly referred to as an I/O interface bus. This I/O bus is normally connected to a resident controller in the host computer and is generally implemented in a physical backplane or cable, but it is the useage made of the various signals defined within the I/O interface bus which differentiates one I/O interface bus from the next. This invention is concerned with an improvement in this I/O interface bus.

Until now, I/O device interface busses have been designed to deal with only a single event and a single I/O device at any given time, (i.e. the bus has been used to communicate, in whatever fashion, with only one I/O device at a time) regardless of whether or not there is more than one I/O device connected to that bus and to transfer only one type of information to that I/O device at a time. Known prior art I/O busses such as SMD or ESDI deal with the I/O devices as a very low level, requiring the controller in the host computer to take charge of the actual, physical READ or WRITE operation, as well as converting the data between Serial and Parallel forms. Newer known prior art busses such as SCSI allow the controller to deal with the device at a higher level, leaving the control of the physical operation, as well as the data conversion, to the I/O device, while leading the controller free to assume a more efficient supervisory role.

All of the known prior art I/O busses share, to varying degrees, a common problem which is that, since the controller can only communicate with a single I/O device at any given time, any other I/O device must wait for that previous communication (or multiple communications) to be completed before its operation may be serviced. For example, if one I/O device begins an 8,192 byte data transfer at a transfer rate of 1,000,000 bytes per second, and a request is then given to the controller to access another I/O device, the controller will not be able to instruct the other I/O device to begin the operation until the first I/O device has finished its data transfer (8.2 milliseconds later). Generally, the largest amount of time involved in accessing these I/O devices is the initial SEEK (i.e. the positioning of the device to access the desired information) which does not involve any transfer of information beyond the initial command.

As can be appreciated, there is theoretically nothing to prevent the above two operations from being carried out at the same time (in parallel), except for the controller's inability to communicate the necessary information to the other device. The example noted above can be generalized to a system with any number of I/O devices, further aggravating this problem, with a concomittant loss in performance.

Accordingly, it is an object of this invention to provide a new and improved I/O interface bus for use in coupling a resident host controller to one or more of I/O devices.

It is another object of this invention to provide an I/O interface bus which is designed and arranged to allow a host resident controller to communicate with more than one I/O device at the same time.

It is still another object of the invention to provide an I/O interface bus which is designed and arranged to allow a host resident controller to transfer a plurality of different types of information to one or more I/O device at the same time.

It is yet still another object of this invention to provide an controller interface and an I/O device interface for handling information transfers as described above.

It is a further object of this invention to provide an I/O interface bus system for intelligent, high performance mass storage I/O devices.

SUMMARY OF THE INVENTION

With the intelligent I/O devices currently available, any operation may be broken down into the following four events:

A. The command—This is the initial communication with the I/O device, including all the necessary information as to where the desired data is stored and how much data is desired. This communication will trigger the SEEK within the device.

B. Device request for data transfer—Once the I/O device has positioned itself appropriately, it will signal the controller that it is ready to transfer data.

C. Data transfer—the actual transfer of data to or from the controller.

D. Device signals operation complete—when the physical operation is complete and all the data has been transferred, the I/O device signals that it is done with that operation, so that the controller may initiate a new operation, if one is available.

The basic concept of this invention is to divide the I/O interface bus into three sections, each section being completely independent of the other two, and each section being capable of handling one or more of the events outlined above. More specifically, in the embodiment to be hereinafter described one section identified as the Command Section will handle the A event, another section identified as the Control Section will handle the B and D events while the third section identified as the Data Section will handle the data transfer or C event.

In an implementation of the invention hereinafter described, differential transceivers are used to drive the signals across the physical cable and the signals carried in the cable are limited to twenty-four in order to be able to use a standard fifty conductor cable.

The Command Sectin of the I/O interface bus, which is used to transfer the initial information to the I/O device, as well as to retrieve status information when necessary, is implemented through an SDLC serial interface in order to minimize the number of signals needed. Through this serial interface, any given device can be sent a packet of information detailing the operation to be performed. Since the SDLC protocol supports packet addressing, any given packet may be sent to any given device without the need for external device selection logic. In order to improve performance, a simple DMA circuit is paired with the SDLC interface to complete this section. It should be noted that this section could just as well be implemented as a parallel interface if more than 24 signals are made available.

The Direct Control section of the I/O interface bus performs functions relating directly to control of the state of the device, such as interrupts, data bus assignment, aborts and resets. In the implementation hereinafter described, a 3-bit field selects which device to be controlled and another 3-bit field selects which control function is to be performed. Also, a single interrupt signal is wire-or'ed amongst the devices, such that any device wishing to be serviced may assert that line, causing the controller to issue a special Interrupt Query command to each device, the device responding, if it has an interrupt to present, with an interrupt code, e.g. a request for data transfer or an operation complete. When the controller is ready to transfer data to or from a given device, it may issue an Assig Data Bus function to that drive, allowing that device to commence the transfer of data. At any time, the controller may issue an Abort or Reset function, as necessary, since any operation involving the other two-sections leaves the Direct Control section free. Note again that any number of devices or functions may be supported with the appropriate number of signal lines.

The Data Section of the I/O interface bus is implemented as an 8-bit parallel bus, designed to transfer at a 5 MHZ rate. The transfer is asynchronously clocked by Data Strobe, and may be temporarily suspended via a Suspend signal. As noted before, the Data section may be implemented as any width, and that, although the Suspend signal implies buffering of the data by all devices attached to this I/O interface bus, a non-buffered implementation is certainly possible.

Some of the main features and advantages/or characteristics of the I/O interface bus of this invention are:
1. Intelligent interface.
2. High performance (5 MByte per second transfer rate).
3. Physical device independence.
4. Simultaneous transfer of command, control and data.
5. Bus isolation from powered down devices.
6. Used with standard 50 pin D-type connectors.
7. Device to device transfers.
8. Dual porting.
9. RFI/EMI hardened.

Various features and advantages will appear from the description to follow. In the description, reference is made to the accompanying drawings which forms a part thereof, and in which is shown by way of illustration, a specific embodiment for practicing the invention. This embodiment will be described in sufficent detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In the drawings wherein like reference numerals represent like parts.

FIGS. 2(a) and 2(b) are block diagrams of the controller and I/O device shown in FIG. 2;

Figure 12A:
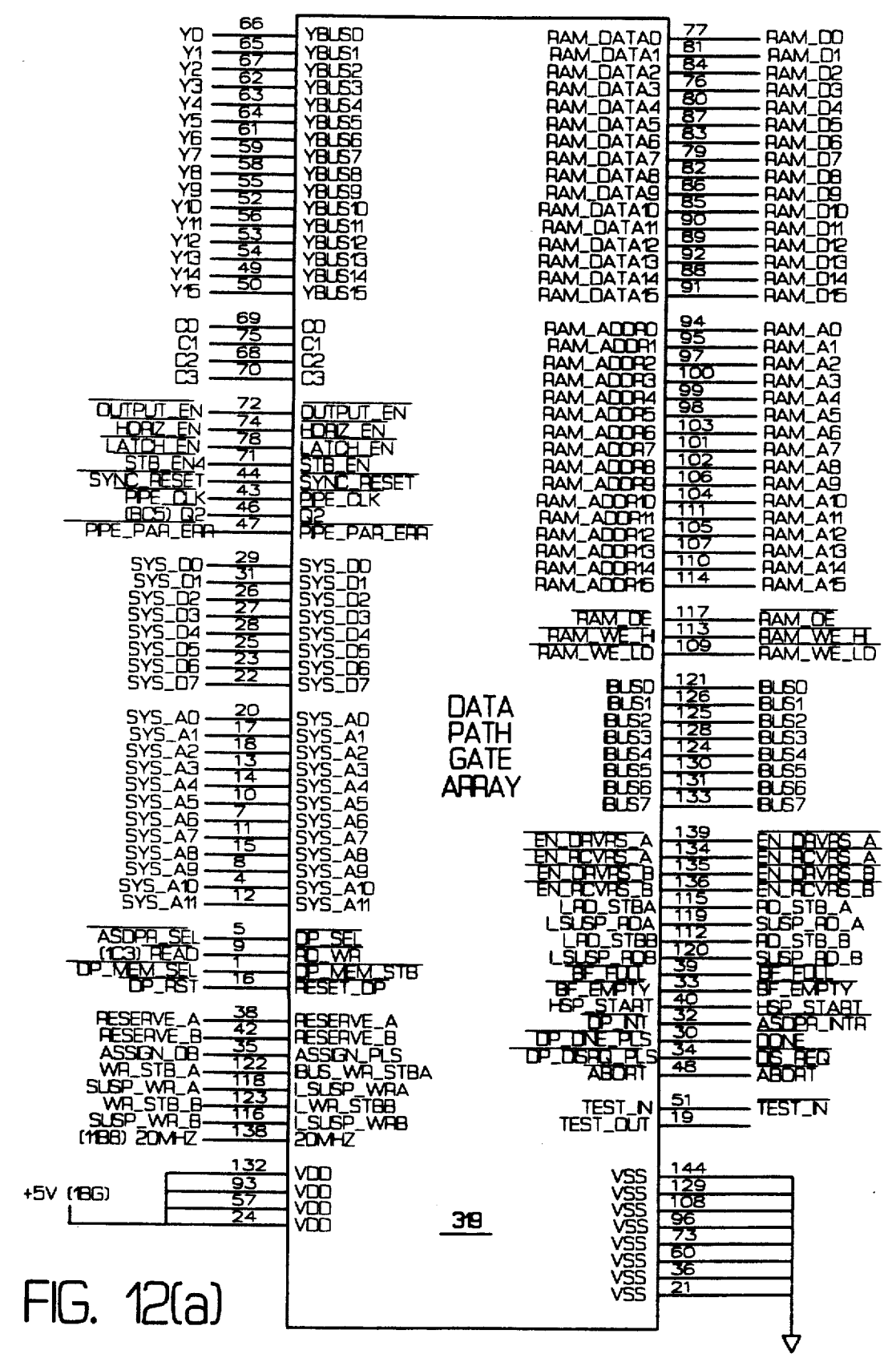

FIGS. 12(a) through 12(f) are schematic diagrams of the I/O device data interface section shown in FIG. 2;

DETAILED DESCRIPTION OF PREFERRED EMBODIMENTS

As used herein in the following description, the term "master" means controller and the term "slave" means I/O device.

Figure 1:
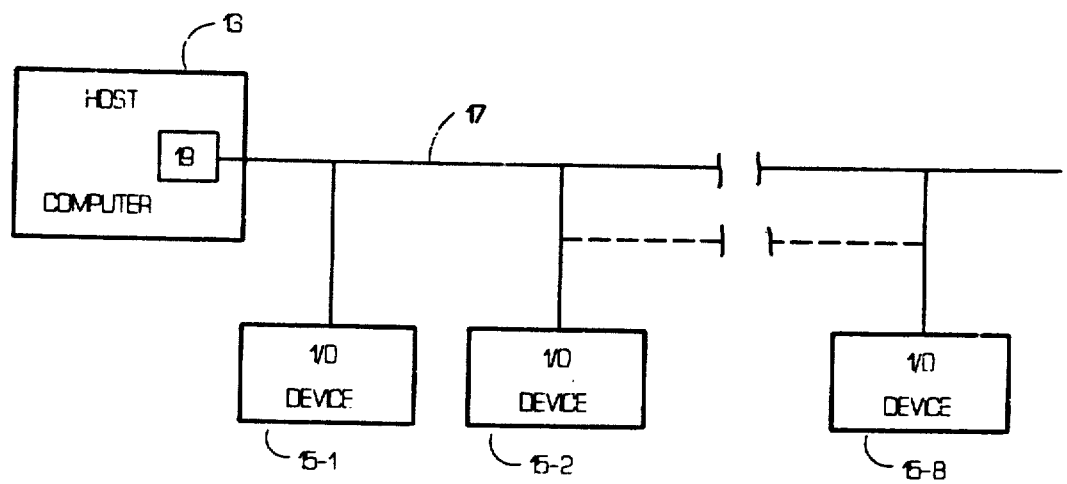
FIG. 1 is a block diagram of a data processing system according to this invention.

Referring now to the drawings, there is shown in FIG. 1 a data processing system 11 constructed according to this invention.

Data processing system 11 includes a host computer 13, a plurality of eight input-output (I/O) devices 15-1 through 15-8, only three of which are shown for simplicity, and an I/O interface bus 17, the I/O interface bus 17 serving to couple I/O devices 15 to computer 13. Devices 15 are high performance, intelligent mass storage type input-output devices. Computer 13 includes a controller 19 which is connected to I/O interface bus 17.

Referring now to FIGS. 2, 2(a), 2(b) and 3, there are shown more detailed block diagrams of controller 19, I/O device 15-1 and the part of I/O interface bus 17 connecting controller 19 to I/O device 15-1. Portions of controller 19 and I/O device 15-1 not pertinent to this invention are not shown. Controller 19 (see FIG. 2(a)) includes buffers and latches 19-0, a burst multiplexer channel interface control section 19-1, a microprocessor 19-2, a memory 19-3, a data section interface 19-4, a command section interface 19-5, a direct control section interface 19-6 and a data buffer (FIFO) 19-7. I/O device 15-1 includes 3 buffers 15-101, 15-102 and 15-103, a memory 15-104, a microprocessor 15-105, a data path RAM 15-106, a data (path) section interface 15-107, a command section interface 15-108 and a direct control interface 15-109. Interface 15-108 takes serial data from bus 31, transforms it to parallel data and presents it to microprocessor 15-105. Direct control section 15-106 interprets commands received over bus section 29 and informs microprocessor 15-105 of these commands via interrupts. Data section 15-107 receives data sent over bus section 27.

Figure 2:
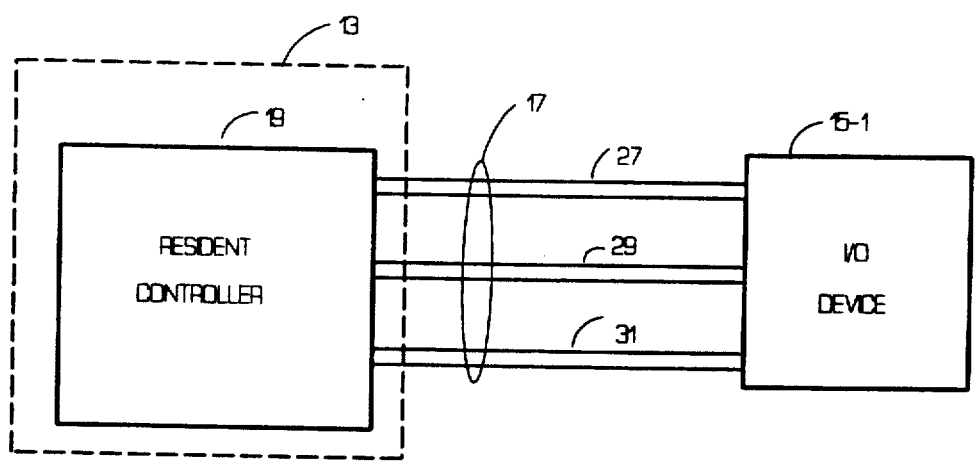
FIG. 2 is a more detailed block diagram of the controller, a portion of the I/O interface bus and one of the I/O devices shown in FIG. 1.
Figure 2B:
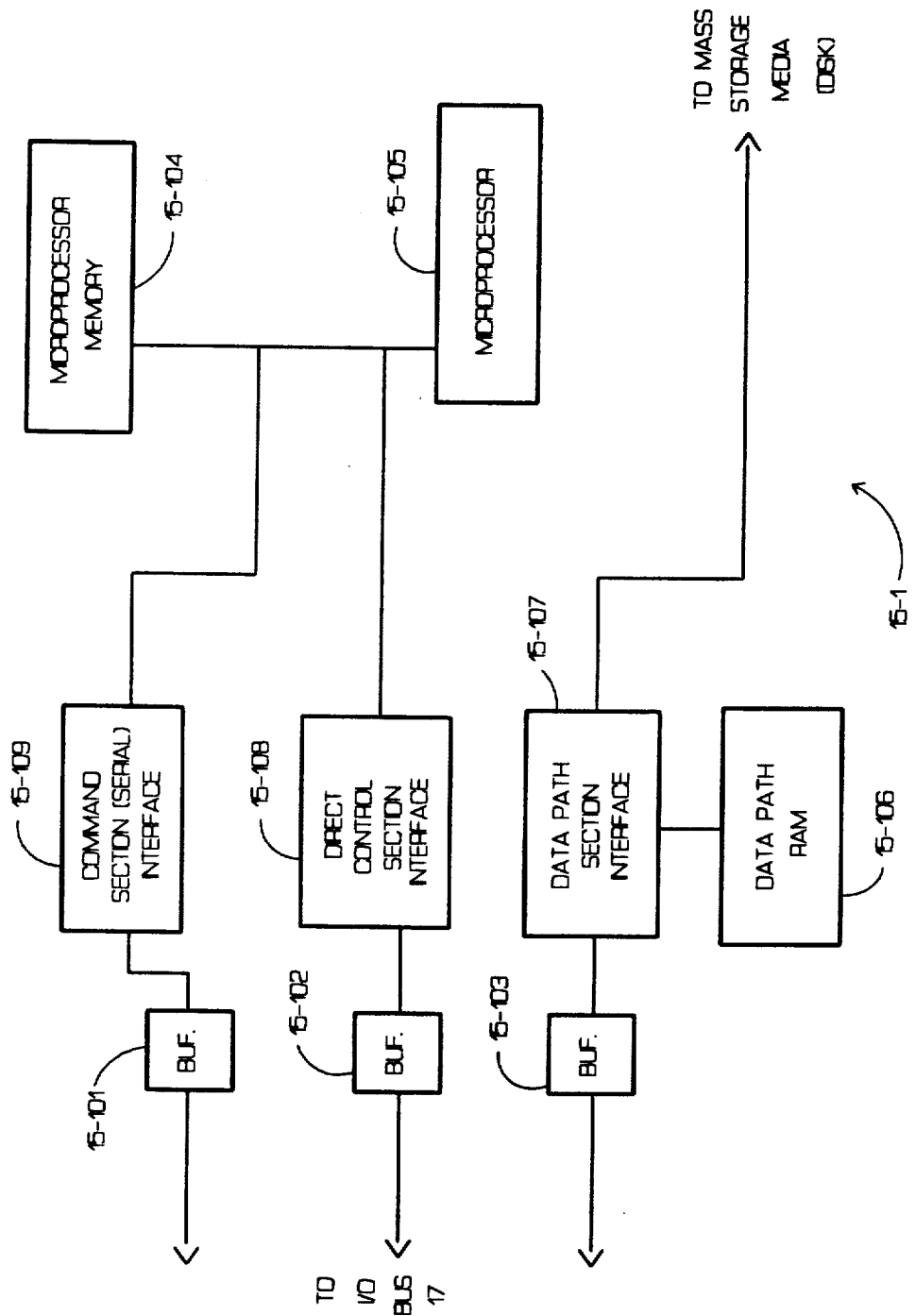
Figure 3:
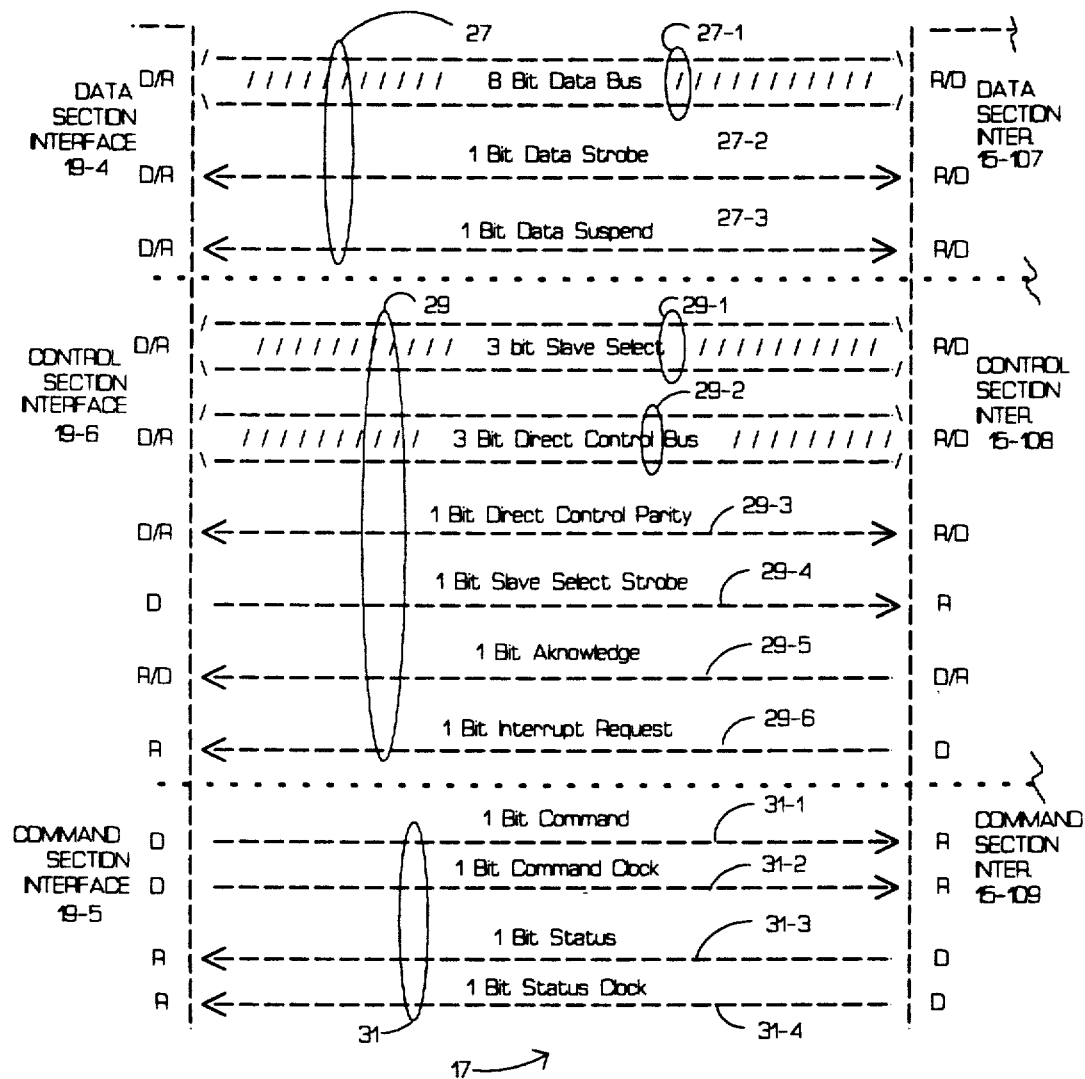
FIG. 3 is a more detailed block diagram of the I/O interface bus system shown in FIG. 2.

As can be seen in FIGS. 2 and 3, I/O interface bus 17 consists of three logical subsections (i.e. three separate groups of wires), namely, a DATA section 27, a CONTROL section 29 and a COMMAND/STATUS section 31. These three sections are completely independent from one another and can all be operating simultaneously amongst different slaves or to a single slave. For example, data can be transferred from slave 15-1 to the master while the master is performing a Control Sequence to slave 15-2 and sending a command to slave 15-3. By definition the master is always the sourcing device for Control Sequences and Commands.

DATA section 27 is used for the high speed transfer of large blocks of data between master-slave or slave-slave pairs and includes ten lines (i.e. line pairs), namely an 8 bit wide Data Bus 27-1, a Data Strobe line 27-2 and a Data Suspend line 27-3. Its operation is completely independent of the Control or Command sections.

Data Bus 27-1 carries 8 parallel bits of data and is used to transfer bulk data between any master-slave or slave-slave pair at rates of up to 5 MB persecond.

Figure 3A:
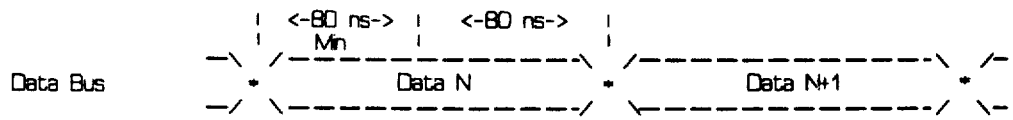
FIGS. 3(a), 3(b) and 3(c) are timing diagrams useful in understanding the invention.

Data Strobe line 27-2 carries a bit of data which is generated by the master or slave that is sourcing the data to be transferred. The falling edge of this line is used to clock data off of the bus. The edge is centered between transitions on the data bus to reduce skew problems. The strobe must be centered within the data window such that it provides 80 ns of setup and hold time around the high to low transition of Data Strobe. A timing diagram illustrating this is shown in FIG. 3(a).

Figure 3B:
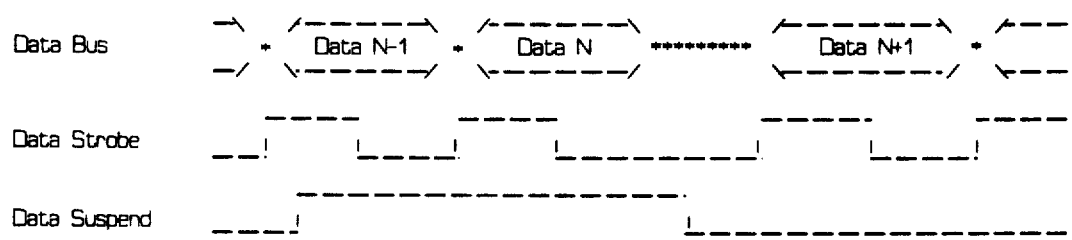

Data Suspend line 27-3 is used to regulate the flow of data on the data bus 27-1 throughout the data transfer. The signal is active high and is used by the master of the slave that is the destination of the current data transfer. The destination device will bring this line high causing the source device to suspend the transmission of data across the data bus. The destination device must have sufficient buffering available for at least 8 additional data strobes after it asserts Data suspend. Upon seeing Data Suspend active, the source device will suspend the transmission of data within 4 data strobes. Data must remain active on bus 39 for at least the normal hold time (80 ns) after the high to low transition of the Last Data Strobe. Data Strobe will remain low throughout data transmission by bringing Data Suspend Low. Upon seeing Data Suspend go low, the source device will resume sending data with the next data element to be transferred. Data must be active for at least the normal setup time (80 ns) before the falling edge of the first Data Strobe. A timing diagram illustrating this is shown in FIG. 3(b).

The CONTROL section 29 which regulates the mode of bus 17 and the devices on bus 17 consists of a set of ten lines, namely, three Slave Select lines 29-1, three Direct Control lines 29-2, a Control Parity line 29-3, a Slave Select Strobe line 29-4, an Acknowledge line 29-5, and an Interrupt Request line 29-6.

Each control sequence between a master and a slave consists of two basic cycles, an OUT cycle and an IN cycle. The OUT cycle is always initiated by the master, and contains the slave address of the slave and a particular control code to execute. The IN cycle is always initiated by the slave after it has recognized an OUT cycle containing its slave address. In all cases except the INTERRUPT QUERY control code the slave will echo back it slave address and the control code during the In cycle.

Slave Select is used to designate the destination address of the control sequence. During an OUT cycle the master will put the slave's address on these lines. The slave will echo its address on the same lines during the IN cycle of the control sequence.

During an OUT cycle the three bits of Direct Control are used to specify a control code for the slave, whose address is asserted to the Slave Select Lines, to execute. There are eight possible control codes that the master can request a slave to execute. All of these codes are acknowledged immediately during the corresponding IN cycle of the control sequence. Some, but not all, of these control codes will cause the slave to interrupt the master upon the completion of the requested command.

Upon recognition of a control code and its slave address, the addressed slave will respond with the appropriate IN cycle (See Control Sequence Timing Below). For all control codes except INTERRUPT QUERY, the slave will echo back the control code on the Direct Control Lines during the IN cycle. For INTERRUPT QUERIES the slave will echo back its slave address along with an appropriate INTERRUPT CODE if the slave has an active interrupt. If the slave has no active interrupt, it will ignore an INTERRUPT QUERY.

Control Codes can be used for whatever function are necessary to the control drive. Three are shown by way of example, and named Interrupt Knowledge, Interrupt Query and Assignds.

Interrupt Acknowledge (INTA) is issued by the master in response to an interrupt requested by the slave (the slave's address is obtained via the INTQRY command). Upon receiving an INTA, the slave will perform the IN cycle for the INTA and then release its assertion of the interrupt line (within 500 ns) if no other interrupts are pending in the drive. If the slave was not asserting an interrupt when it receives the INTA, it will ignore the OUT cycle and the master will time out the IN cycle causing an error.

Interrupt Query (INTQRY) is used to identify the address of the slave requesting an interrupt. An INTQRY consists of an OUT cycle followed by an IN cycle. The OUT cycle will contain slave address and the INTQRY code. Upon recognizing the INTQRY control code and its slave address, the slave (if it has an active interrupt) will respond with an IN cycle that returns its address on the Slave Select Lines and one of 8 Interrupt Codes on the Direct Control Lines (See Interrupt Codes below). If the addressed slave has no active interrupt to return it ignores the INTQRY control code. To identify the source of an interrupt the master must query each slave until a slave responds with an interrupt code.

ASSIGNDB is issued by the master, in response to a Data Bus Connect Request, to give the slave control of the Data Bus. Upon receiving the ASSIGNDB, the slave will perform the pending data transfer and then interrupt the master when the transfer is complete. The Interrupt Code will be DONE if the transfer completed with no error, otherwise, the Interrupt Code will be ERROR.

A slave can interrupt the master by asserting the Interrupt Request Line causing the master to respond with an INTQRY control command. The slave can present the master with one of eight Interrupt Codes during the appropriate IN cycle of the INTQRY. The different Interrupt Codes reduce the amount of status that is sent between the master and slave. The codes are prioritized such that PWRFAIL is the highest priority interrupt and ATTN is the lowest. At the completion of the INTQRY command, the master will have the Slave Address and Interrupt Code of the slave requesting an interrupt.

The names of the Interrupt Codes are Power Fail, Operation Done, Data Bus Disconnect Request, Operation Failure (Data Bus) Data Bus Connect Request, Command Complete (no error), Command Error, and Device Able to Accept Commands.

Power Fail (PWRFAIL) interrupt is generated by a slave which has detected that it will lose power imminently.

Operation Done (DONE) is to signal the master that the slave has completed the requested operation (e.g. data transfers, or RESET) without any errors.

Data Bus Disconnect Request (DBDISRQ) is used to disconnect the slave that is currently connected to the Data Bus. In response to a DBDISRQ the master will flush out any data remaining in its buffer, save the current state of the transfer (e.g. map information, host memory address, transfer count etc). When the slave issues this interrupt, it will release its control of the Data Bus. (Note: DBSISRQ is used only to disconnect from a "data" transfer.

Operation Failure (ERROR) tells the master that the slave has aborted the requested data transfer operation. In response to an ERROR, the master will use the serial link to obtain detailed status and retry the operation.

Data Bus Connect Request (DBCONRQ) is issued by a slave that wishes to transfer data on the Data Bus. It is used both the first time a slave requires the Data Bus for the particular operation and if the slave had previously disconnected.

Command Complete (CMDCOM No Error) is used to indicate that the command has completed successfully.

Command Error (CMDERR is set by the slave on any serial link or command interpretation errors.

Device able to accept commands is used to interrupt the master in situations which are not in response to a previously issued command (e.g. recovery from power failure).

A Slave Select Strobe is generated by the master. The rising edge of the strobe is used by the slave to latch the slave Select and Direct Control fields during an OUT cycle.

An Acknowledge signal is generated by the slave. The rising edge of the strobe is used by the master to latch the echoed Slave Address and Direct Control fields during an IN cycle. If the IN cycle was in response to an INTQRY, the master will latch the Slave Address and the Interrupt Code.

Figure 3C:
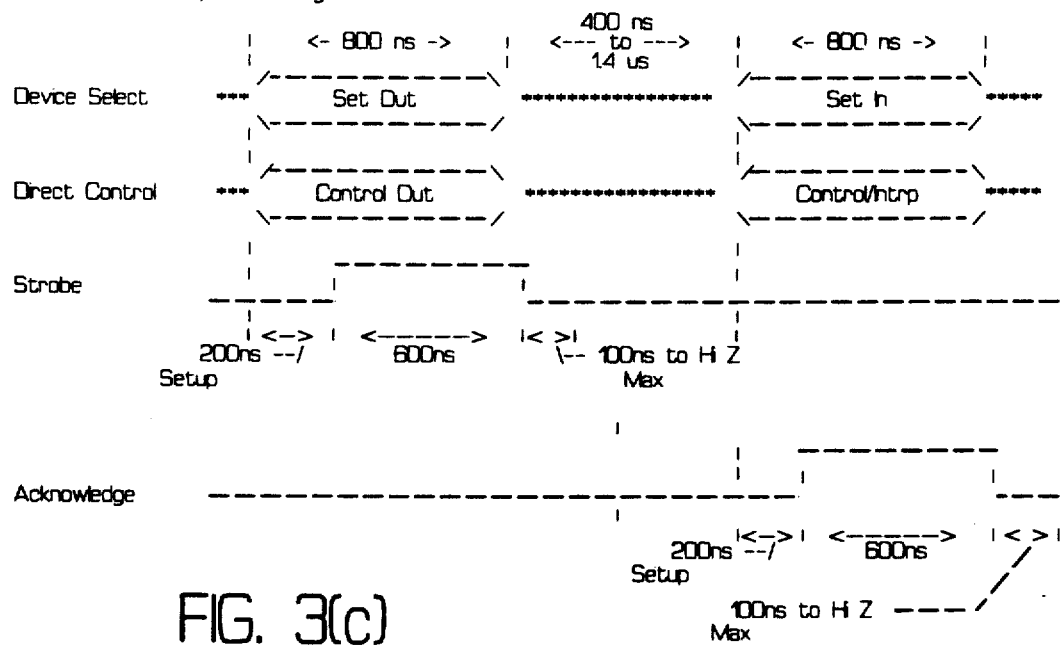

A timing diagram useful in understanding this is shown in FIG. 3(c) Interrupt Request is an active high line that is used by all slaves on the bus to present an interrupt to the master. Normally the line is not actively driven and floats to an inactive low state. When a slave wishes to interrupt the controller it will pull this line high and hold it high until it has received an INTA from the master on the Direct Control Bus (see Direct Control Bus above). More than one slave may assert the Interrupt Request at the same time. Upon receiving the INTA sequence only the slave addressed during the INTA sequence will release its assertion of the Interrupt Request Line.

COMMAND/STATUS section 31 is used to transfer command and status information between any master-slave pair on the bus. This section implements a full duplex SDLC serial link, operating in multi-drop mode and consists of four lines identified as Command 31-1, Command Clock 31-2, Status 31-3 and Status Clock 31-4, respectively.

The Command Line 31-1 is a serial line from the master to the slave over which all commands are transferred.

The Command Clock line 31-2 carries a command clock is generated by the master and is used by the slave to recover data transmitted over the bit serial Command line.

The Status Line 31-3 is a serial line from the slave to the master over which all status signals are transferred.

The Status Clock 31-4 is generated by the slave and is used by the master to recover data transmitted over the bit serial Status Line.

There are at least three basic operations that can be performed by Data section 27. They are: Read, Write, and Slave-to-Slave. In performing these operations care must be taken in enabling and disabling the drivers and receivers so as to avoid generating extra data strobes. The bus sequencing required for the five basic operations is discussed below. The terms Read and Write are referenced with respect to the current bus master. Hence, a Read is a data transfer from the slave to the master and a Write is a transfer from the master to the slave.

The master issues a Read command over the serial command bus to the slave. When the slave is ready to perform the Read operation it interrupts the master with a DBCONRQ. Upon recognizing this interrupt, the master will ussue an INTA. The master will then enable the Ichor data bus drivers and receivers. Next, the master issues an ASSIGNDB to the slave over the Direct Control Bus. The slave is then free to send data to the master at any time, subject to the SUSPEND Line. When enabling the bus, all strobes should be held LOW.

After the slave has sent the last data element, it must hold the data strobe LOW, or disable the bus drivers altogether (which has the same effect). The slave will then present an interrupt to the master of either DONE or ERROR. When the master recognizes the interrupt, it will acknowledge it (INTA), then it will disable its Data Bus and Data Strobe receivers. The slave must disable its bus drives before completion of the INTA cycle. The master must not issue another ASSIGNDB to any other slave until 1 microsecond after it issued the INTA.

In a Slave-to-slave transfer the master has issued an Read command to the source slave, and a Write command to the destination slave, over the serial bus. The master will then wait for the DBCONRQ interrupts from the 2 slaves, acknowledging them with an INTA as they are presented. The master will then assign the data bus to the 2 slaves in whichever order it prefers. Note, however, that if the sourcing slave is assigned the bus first the master must assert the suspend line to prevent the data transfer from occuring before the destination slave has had the bus assigned to it. Note also that the sourcing slave must drive the Data Strobe LOW when enabling its drives.

The slaves, in this situation, are unaware that the transfer is not a normal read or write, and will therefore present interrupts to the master as described in the sections above. Since the slaves are not equipped to deal with disconnects from the master, the sourcing slave should not be allowed to disconnect. The destination slave may still disconnect, since it does so only at the end of the transfer.

Schematic diagrams of an implementation of the controller bus interface section and the I/O device interface section are shown in FIGS. 4 through 15.

Figure 4:
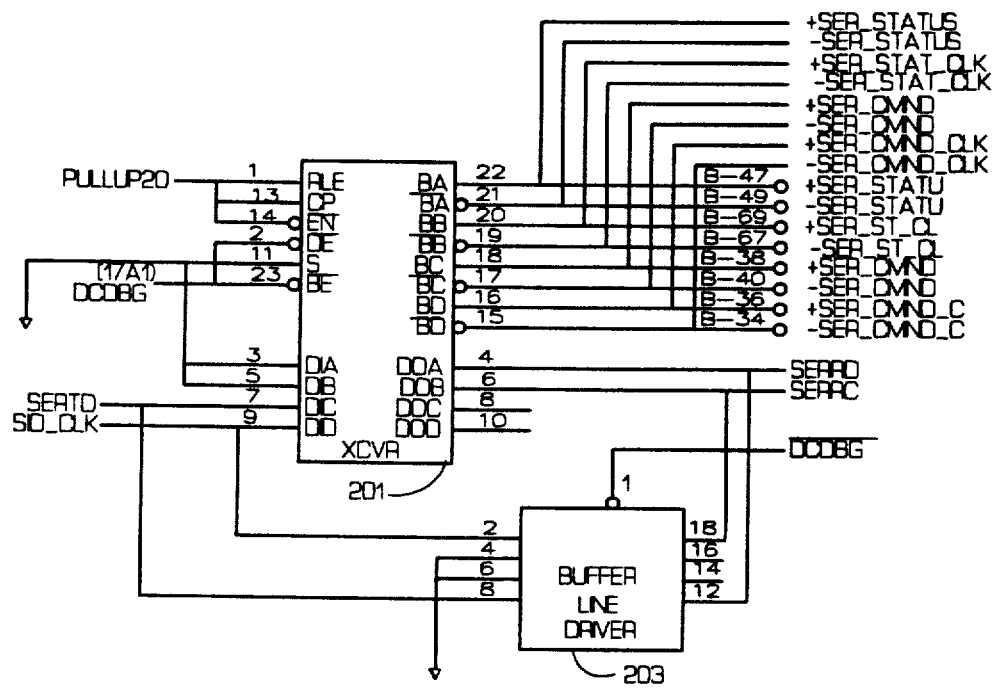
FIG. 4 is a schematic diagram of a portion of the controller command interface section shown in FIG. 2.
Figure 8C:
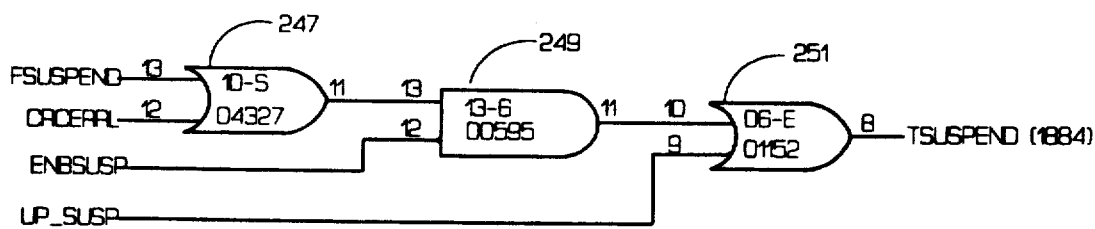
FIGS. 8(a) through 8(d) are schematic diagrams of another portion of the controller data interface section shown in FIG. 2.
Figure 5:
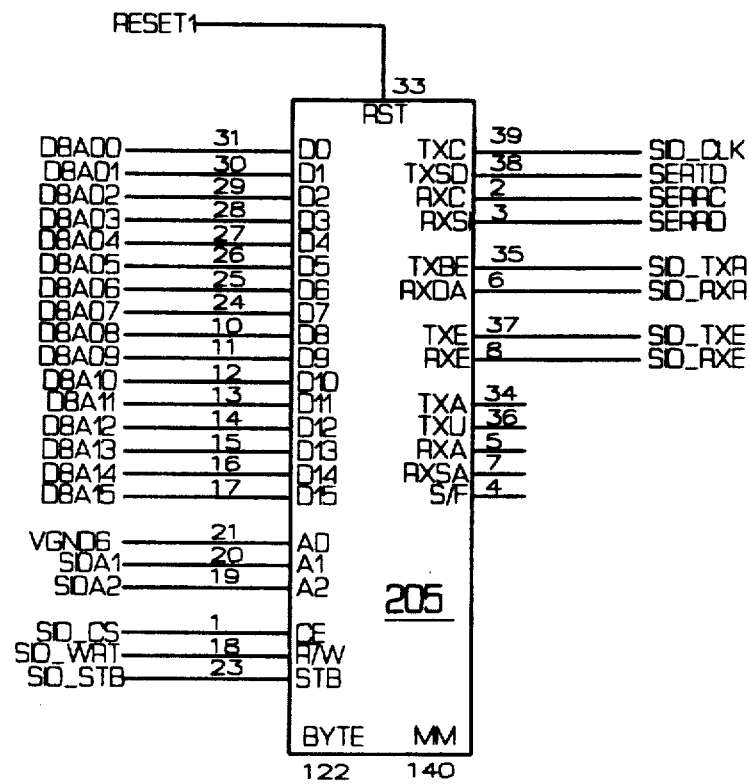
FIG. 5 is a schematic diagram of another portion of the controller command interface section shown in FIG. 2.
Figure 6C:
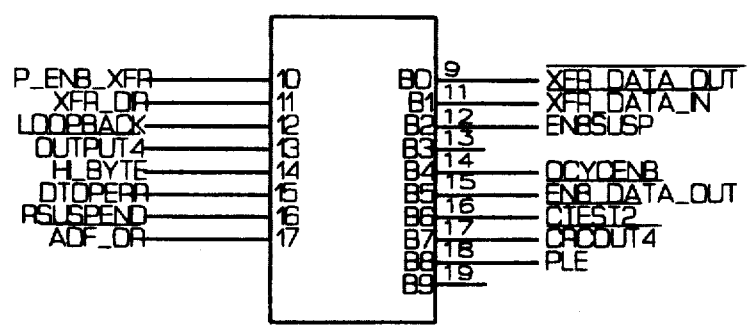
FIGS. 6(a) through 6(g) are schematic diagrams of a portion of the controller data interface section shown in FIG. 2.
Figure 6A:
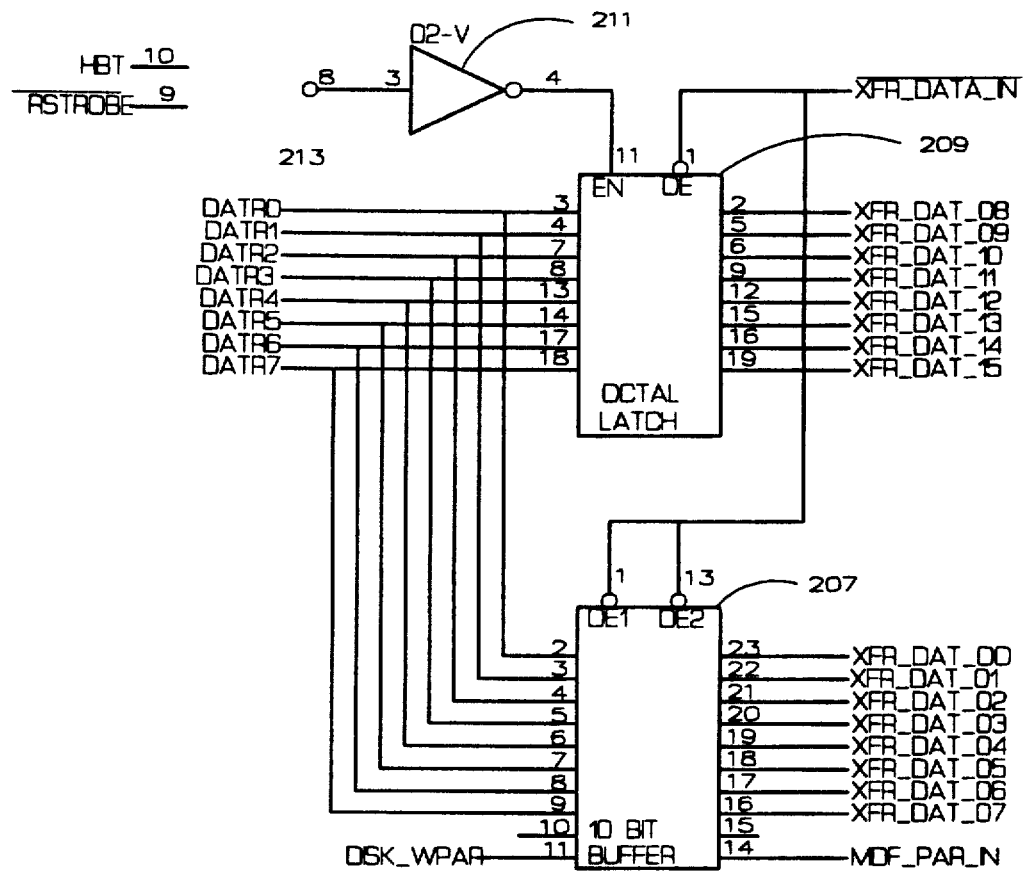
Figure 6D:
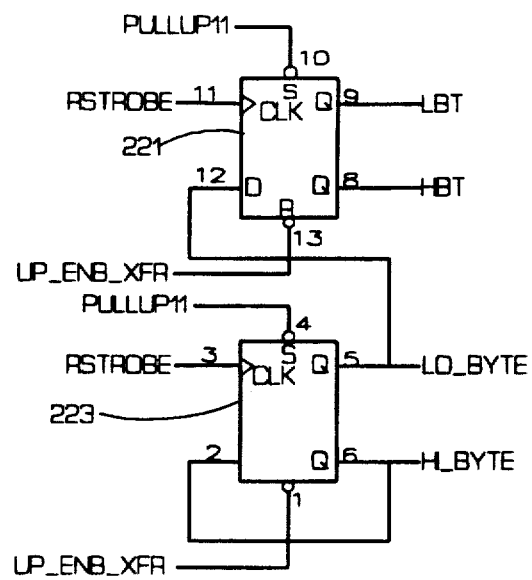
Figure 6B:
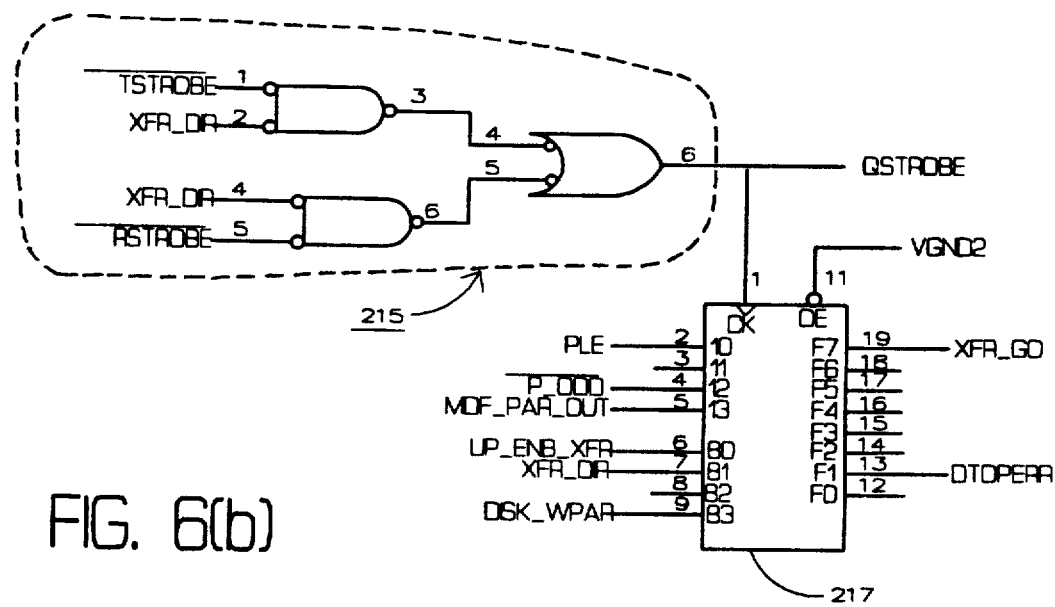
Figure 7:
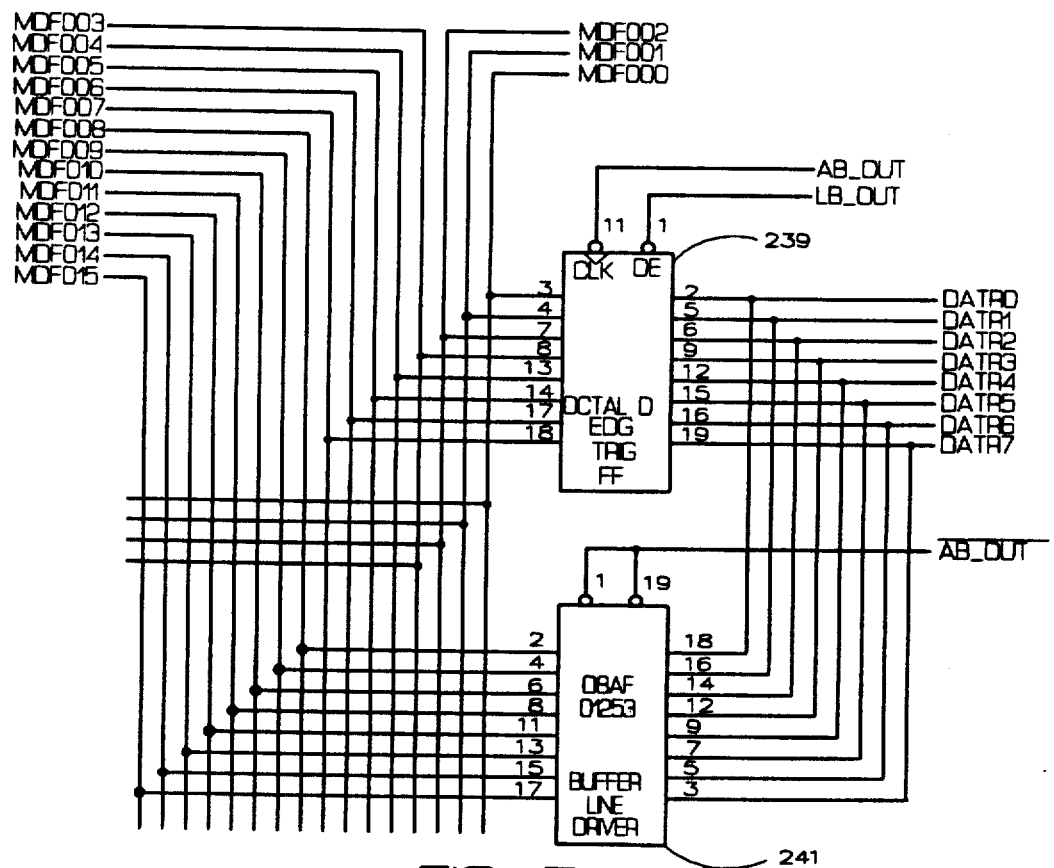
FIG. 7 is a schematic diagram of another portion of the controller data interface section shown in FIG. 2.
Figure 6E:
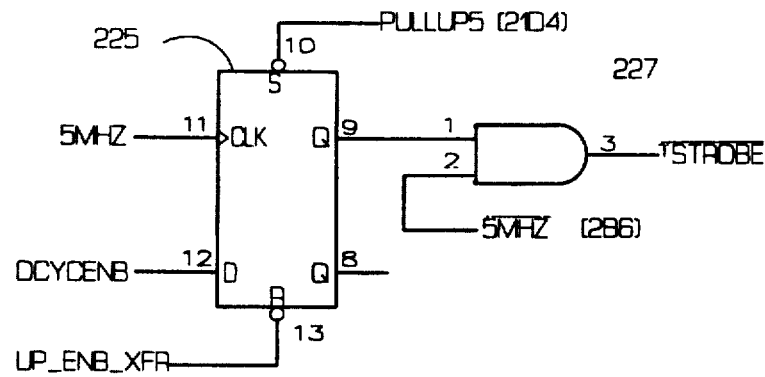
Figure 6F:
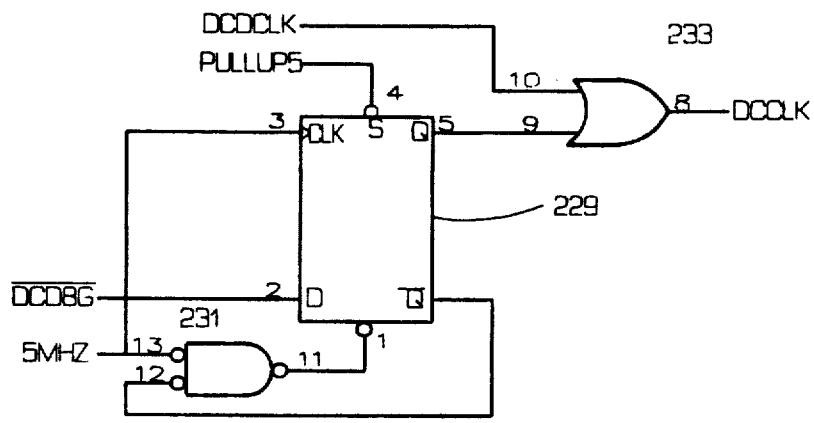
Figure 6G:
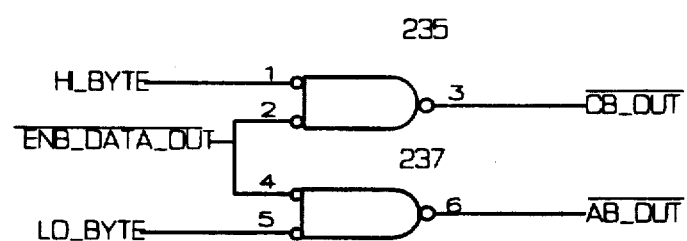
Figure 8A:
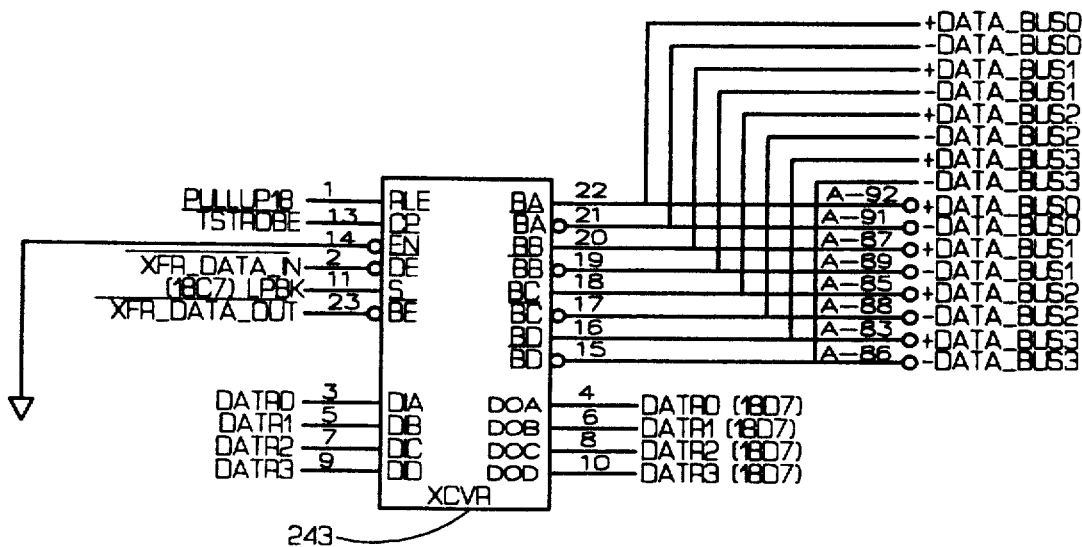
Figure 8B:
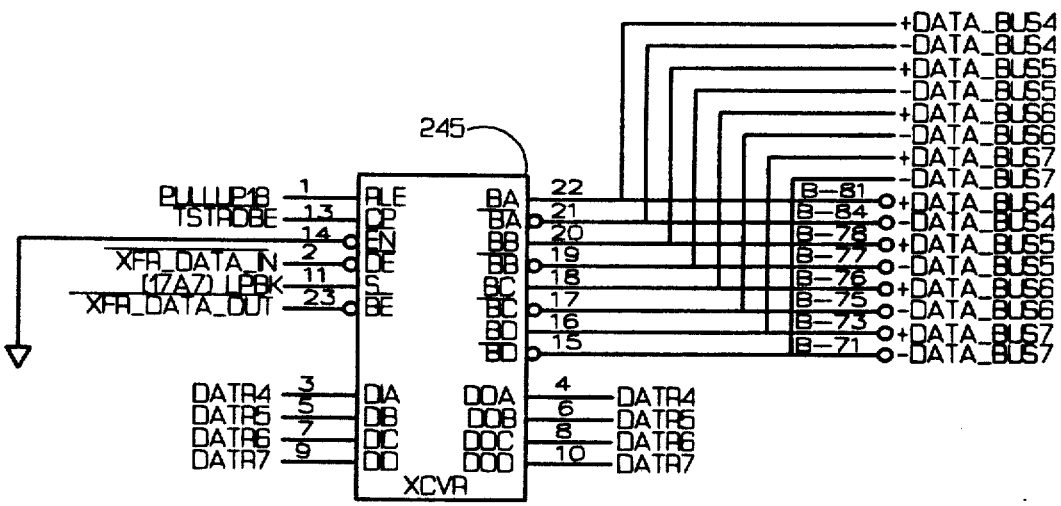
Figure 8D:
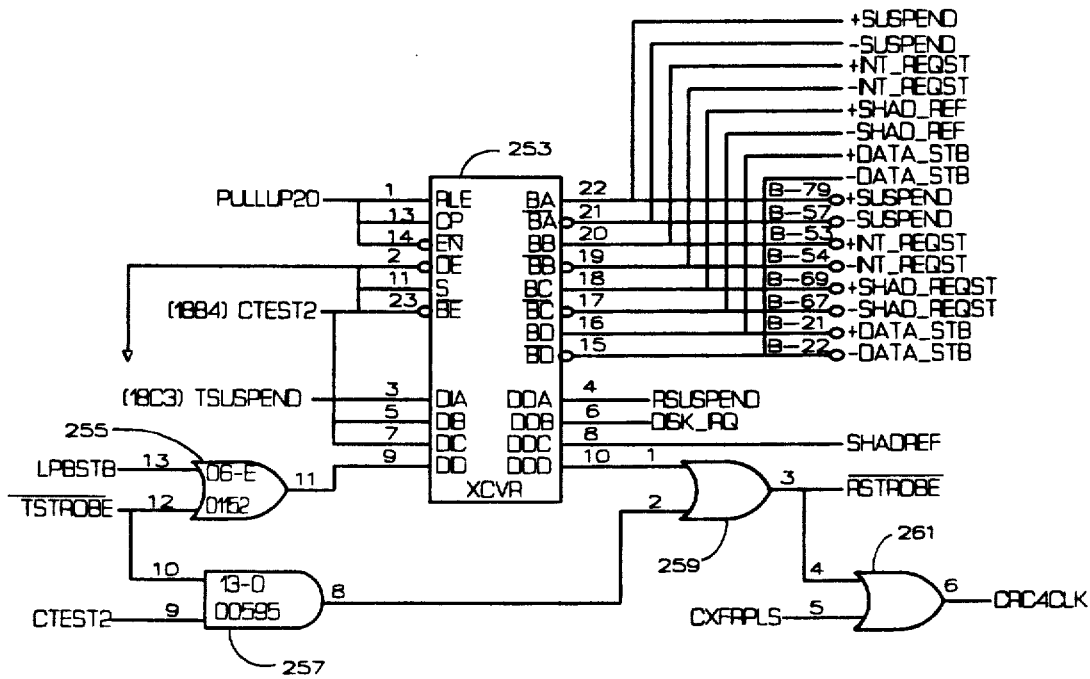
Figure 10C:
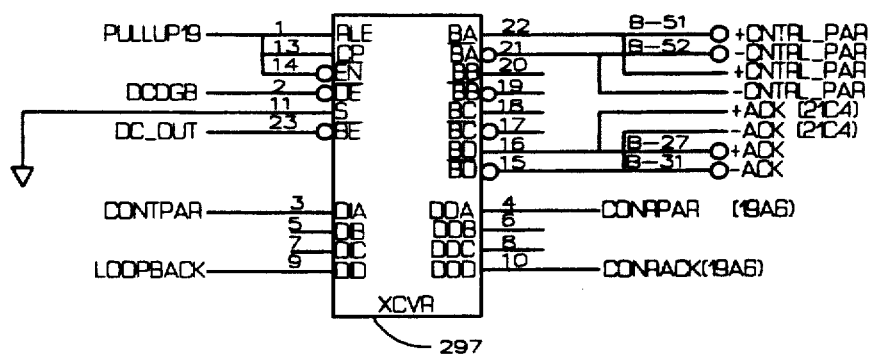
FIGS. 10(a) through 10(d) are schematic diagrams of another portion of the controller direct control interface section shown in FIG. 2.
Figure 9A:
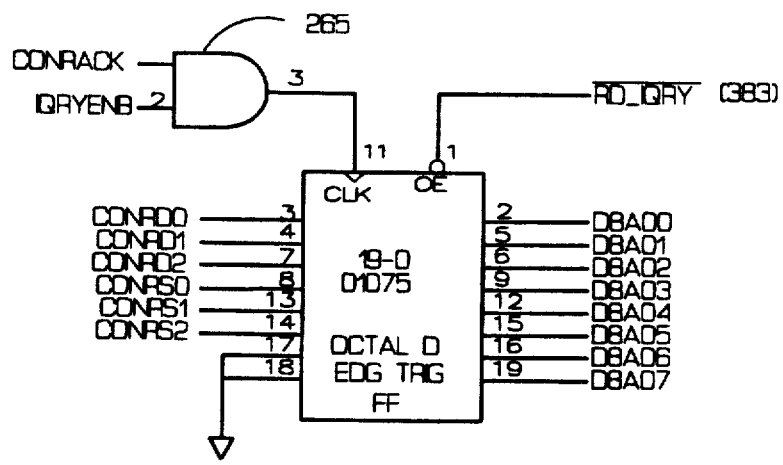
FIGS. 9(a) through 9(g) are schematic diagrams of a portion of the controller direct control interface section shown in FIG. 2.
Figure 9B:
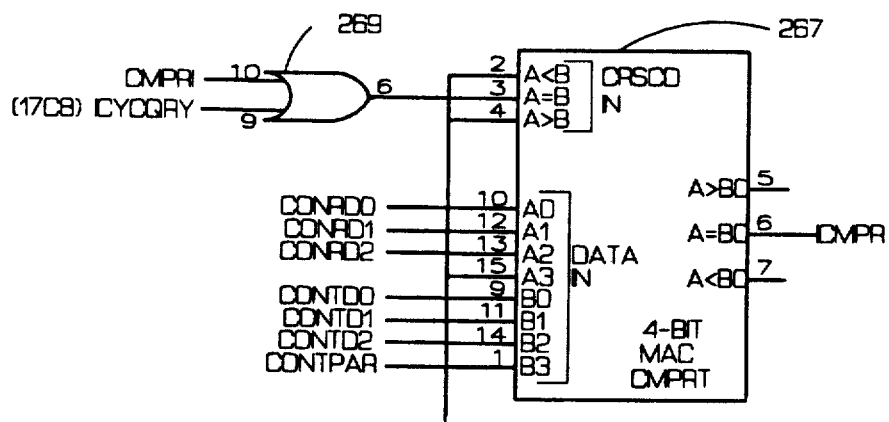
Figure 9C:
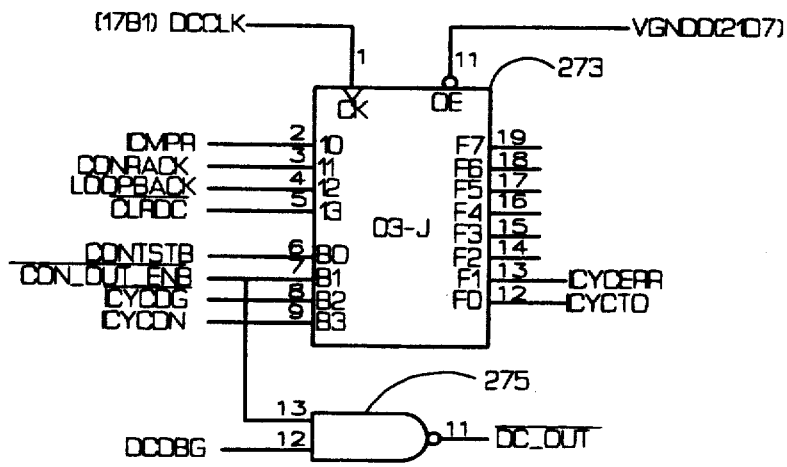
Figure 9D:
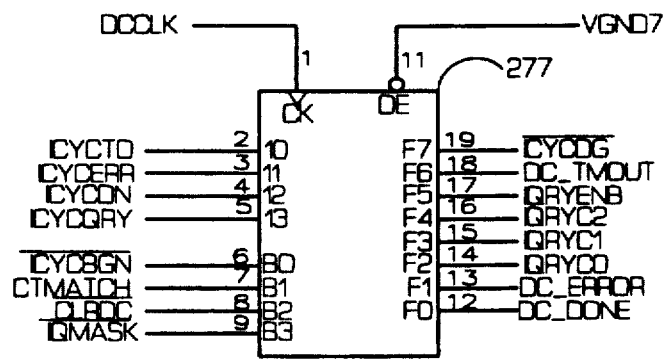
Figure 9E:
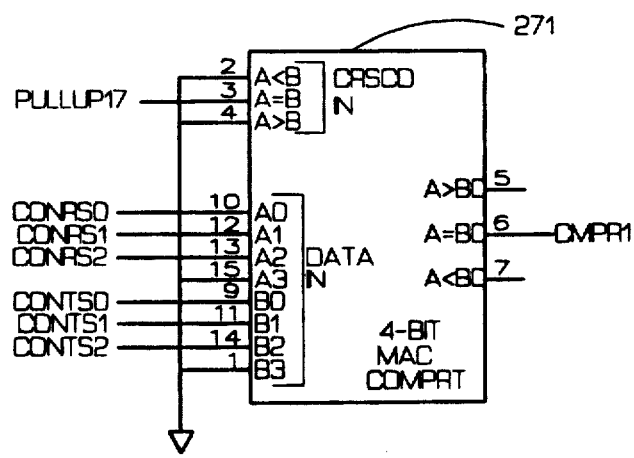
Figure 9F:
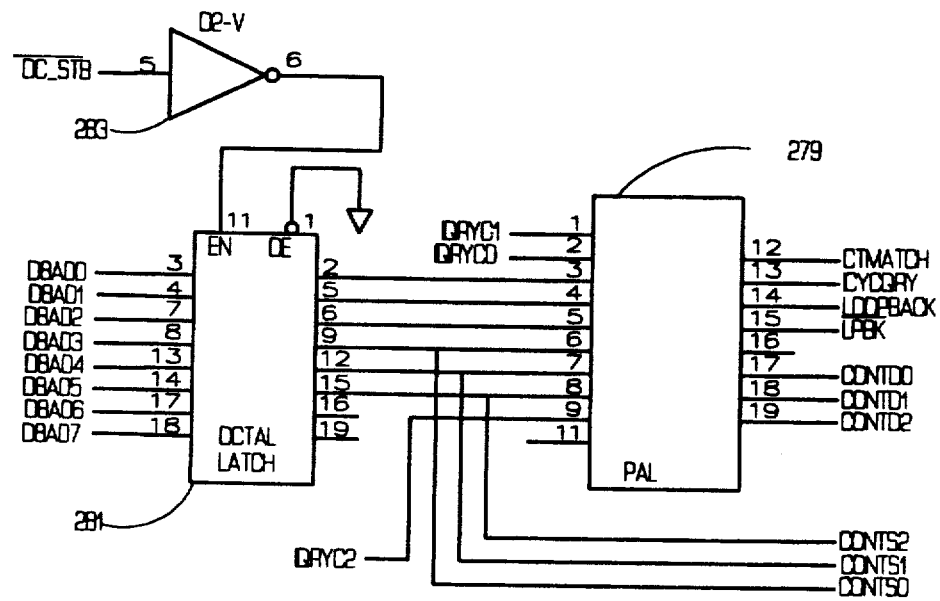
Figure 9G:
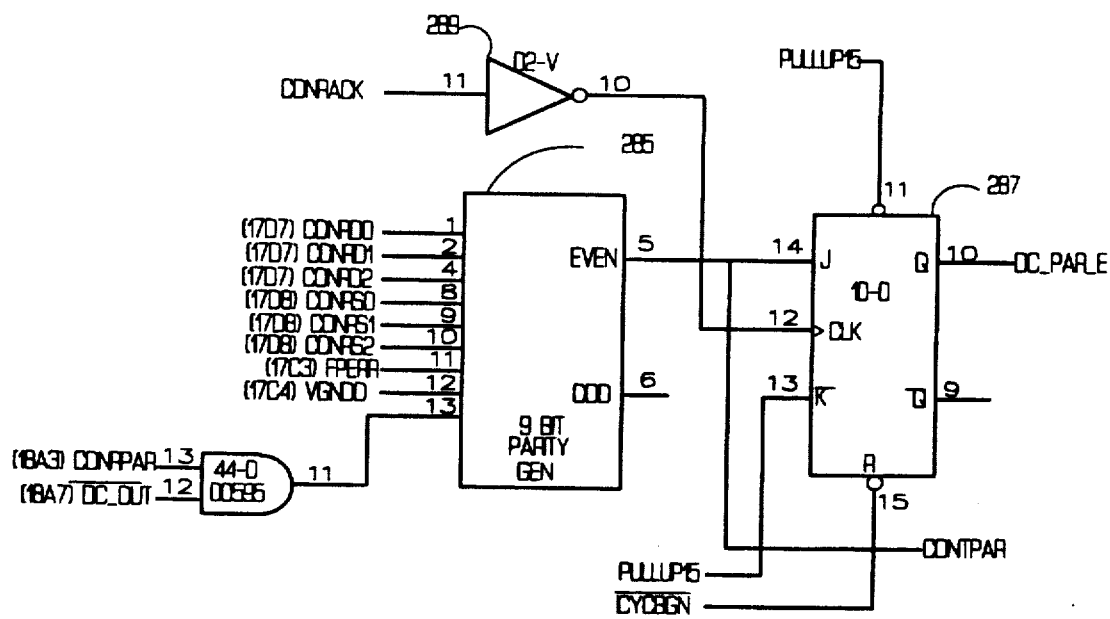
Figure 10A:
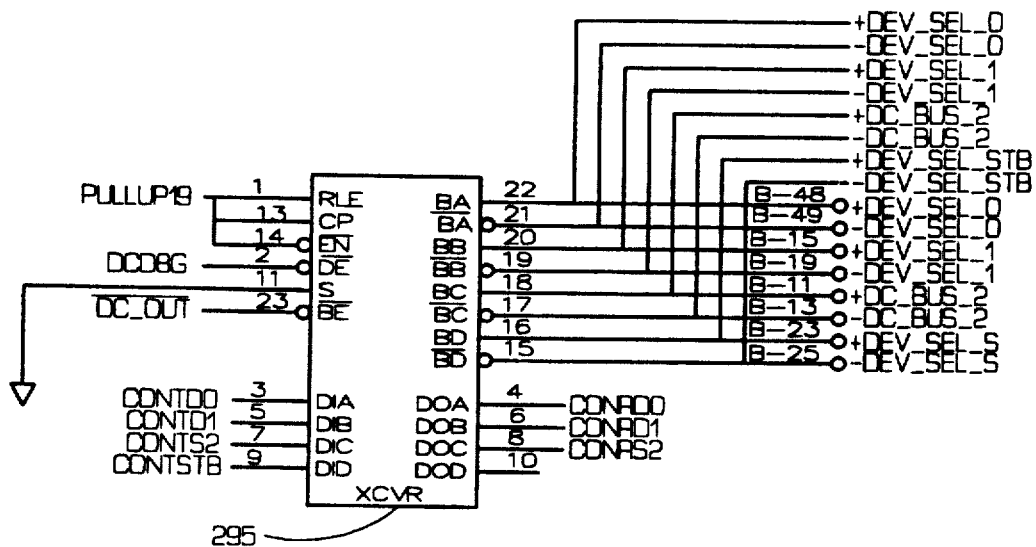
Figure 10B:
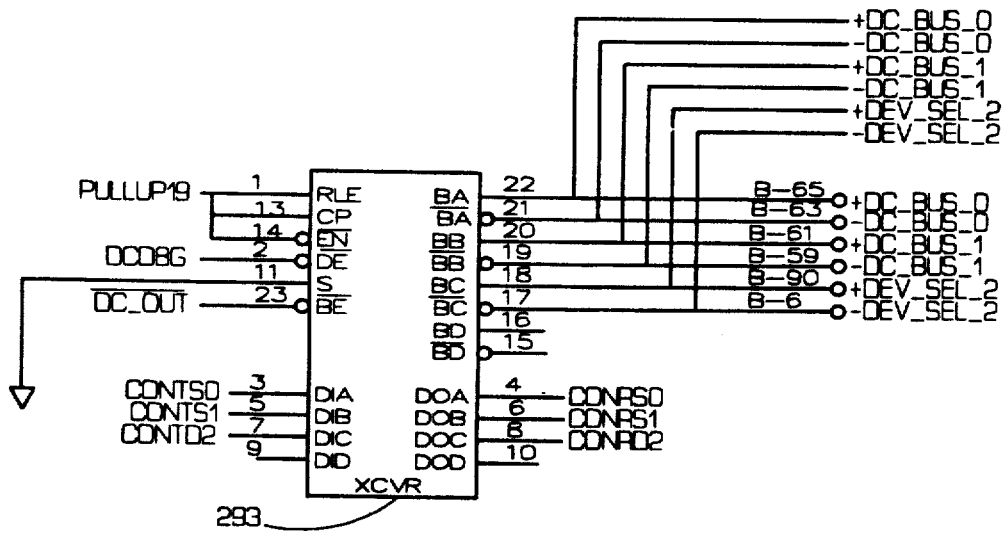
Figure 10D:
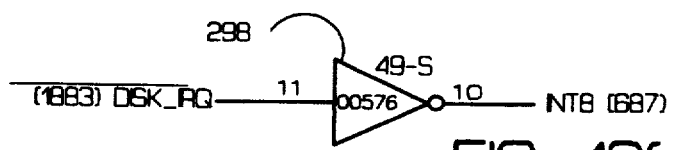
Figure 11A:
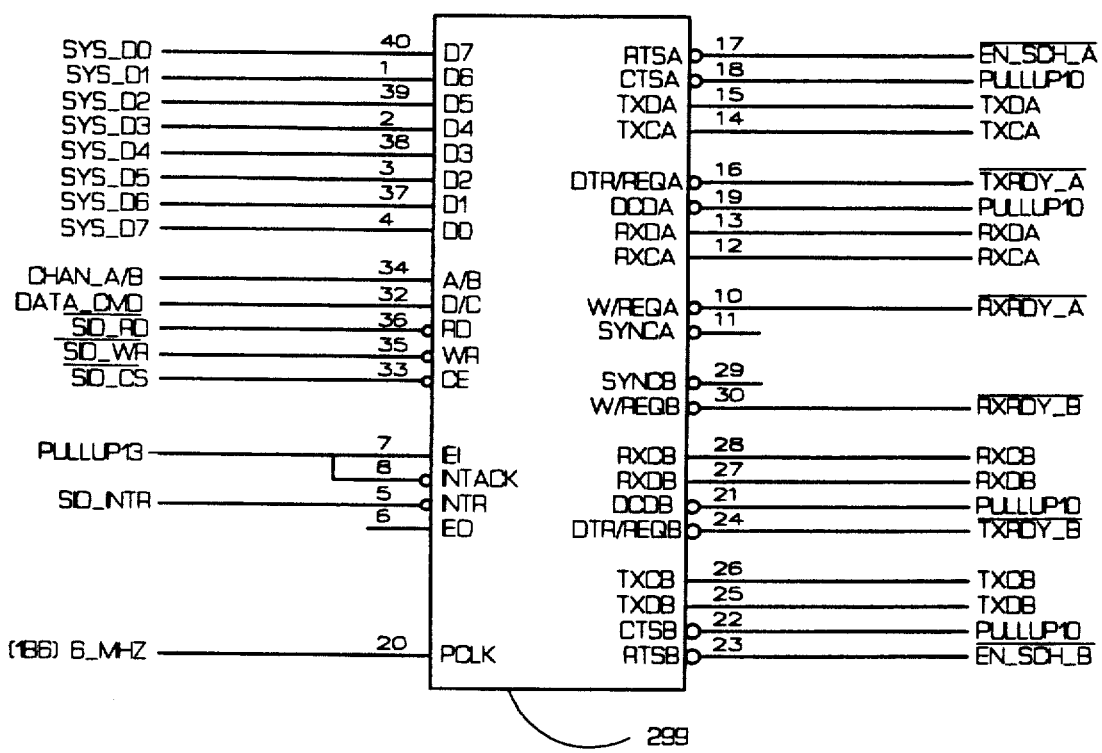
FIGS. 11(a) through 11(e) are schematic diagrams of the I/O device command interface section shown in FIG. 2.
Figure 11B:
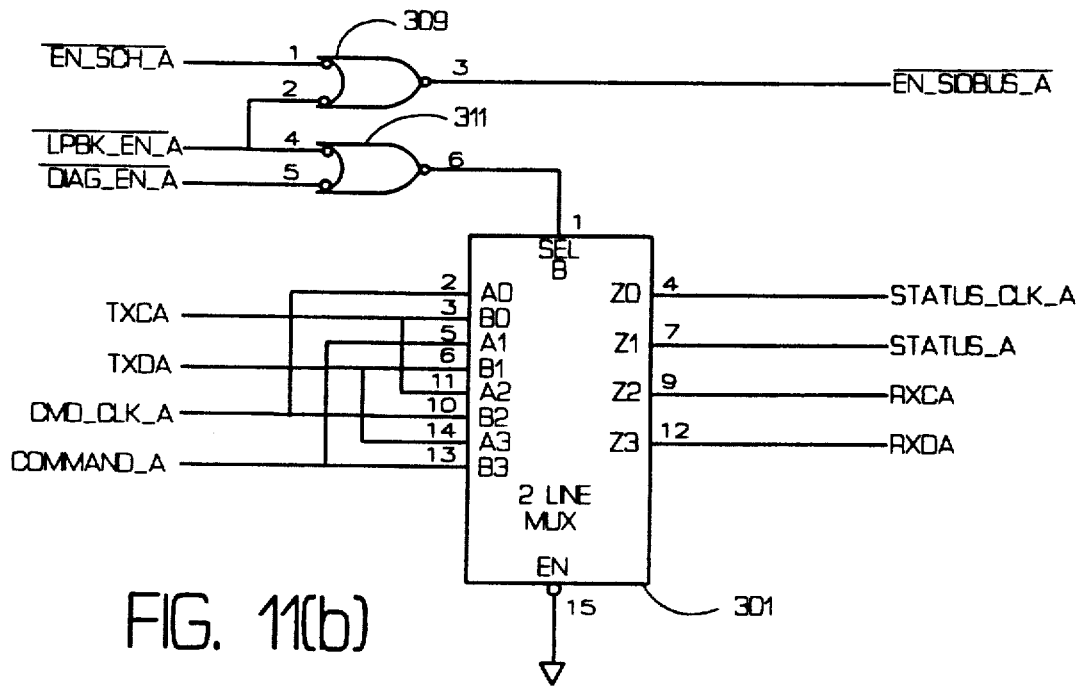
Figure 11C:
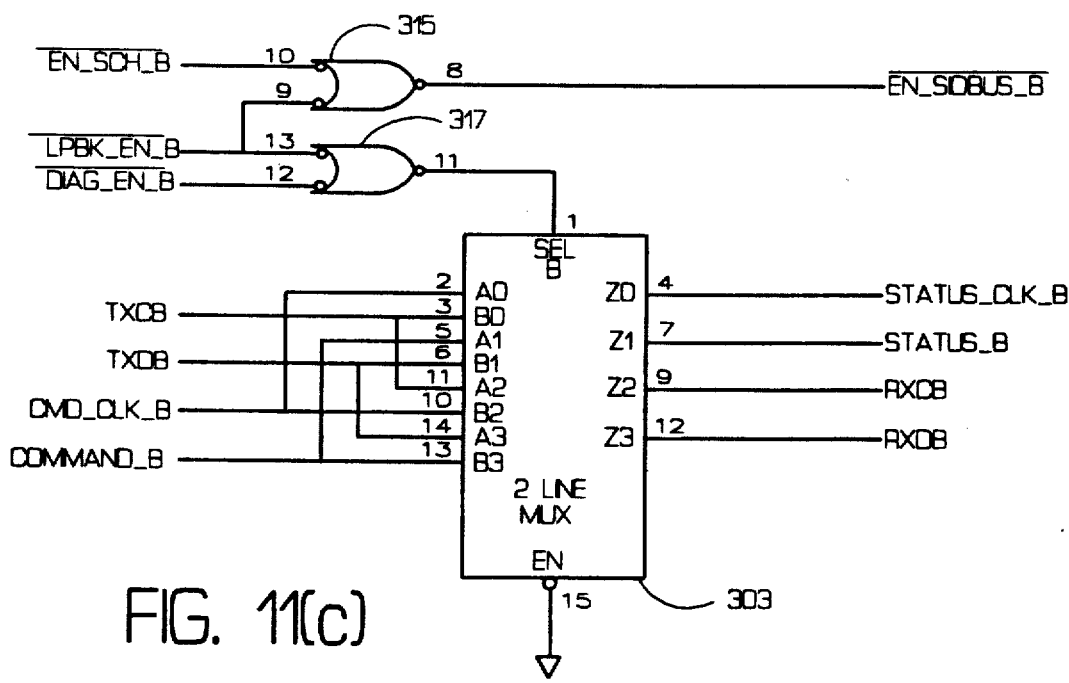
Figure 11D:
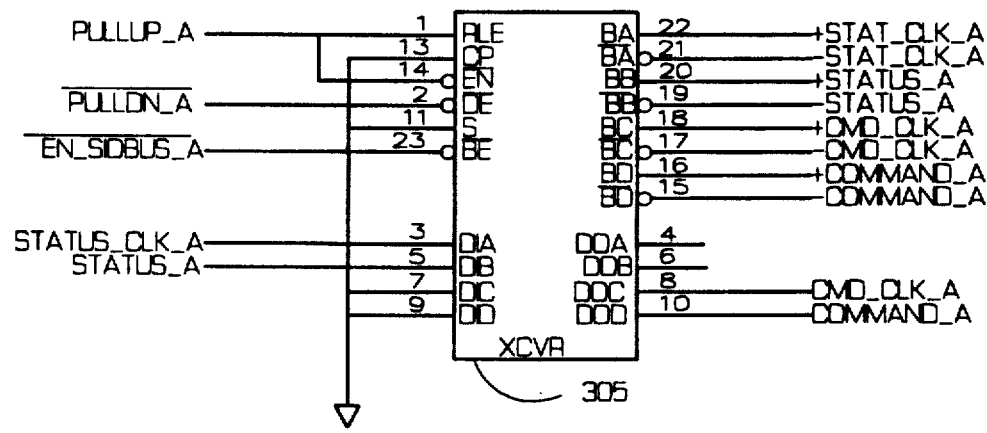
Figure 11E:
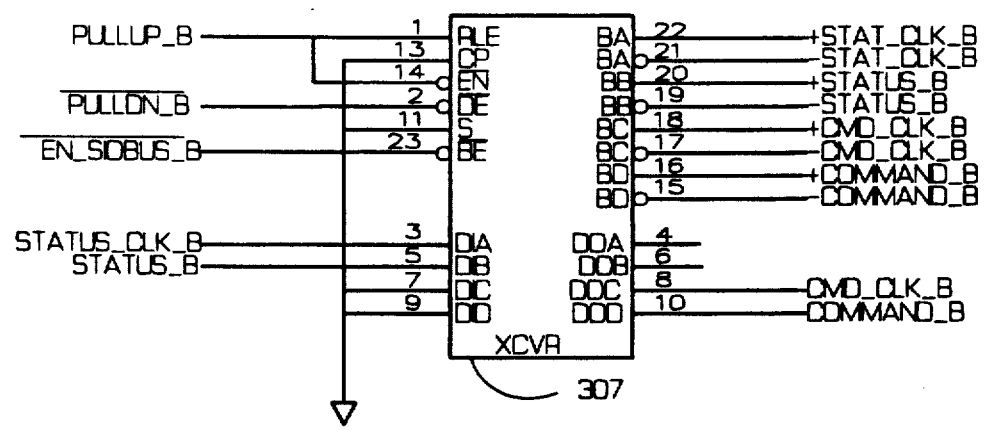
Figure 12B:
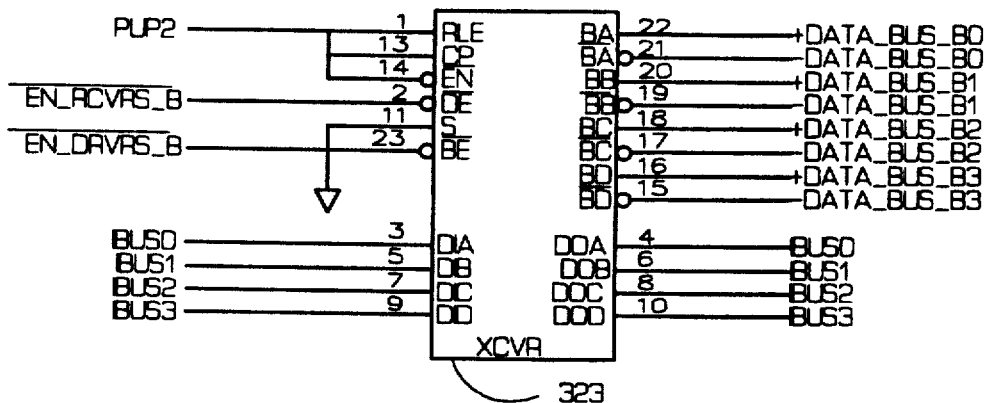
Figure 12C:
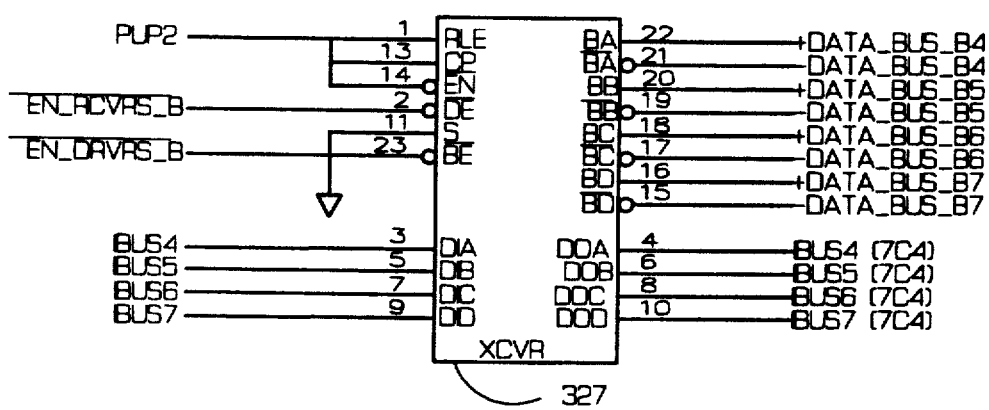
Figure 12D:
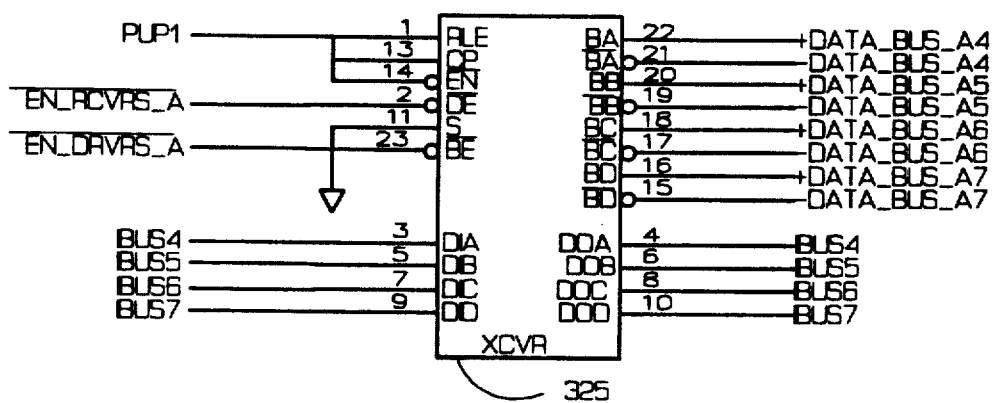
Figure 12E:
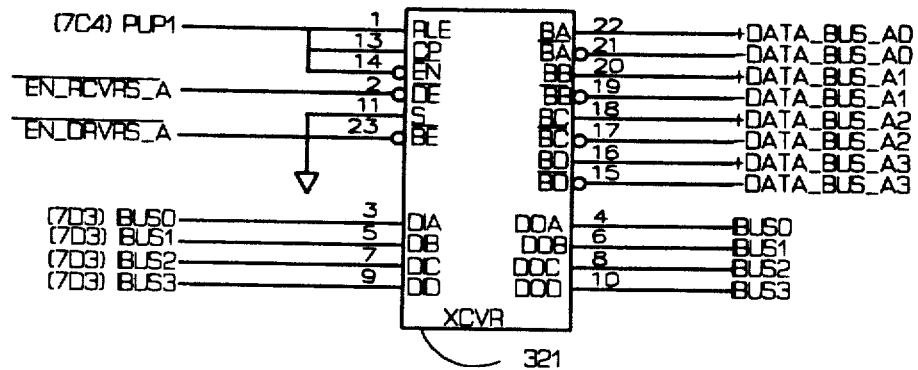
Figure 12F:
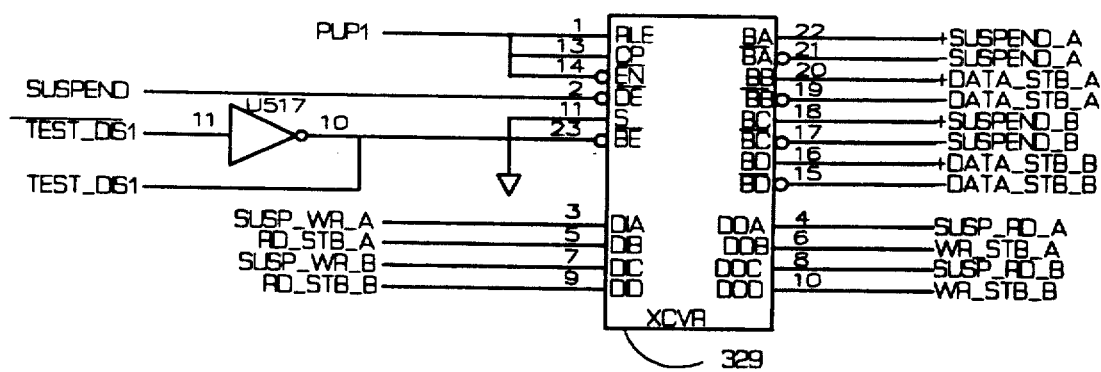
Figure 13A:
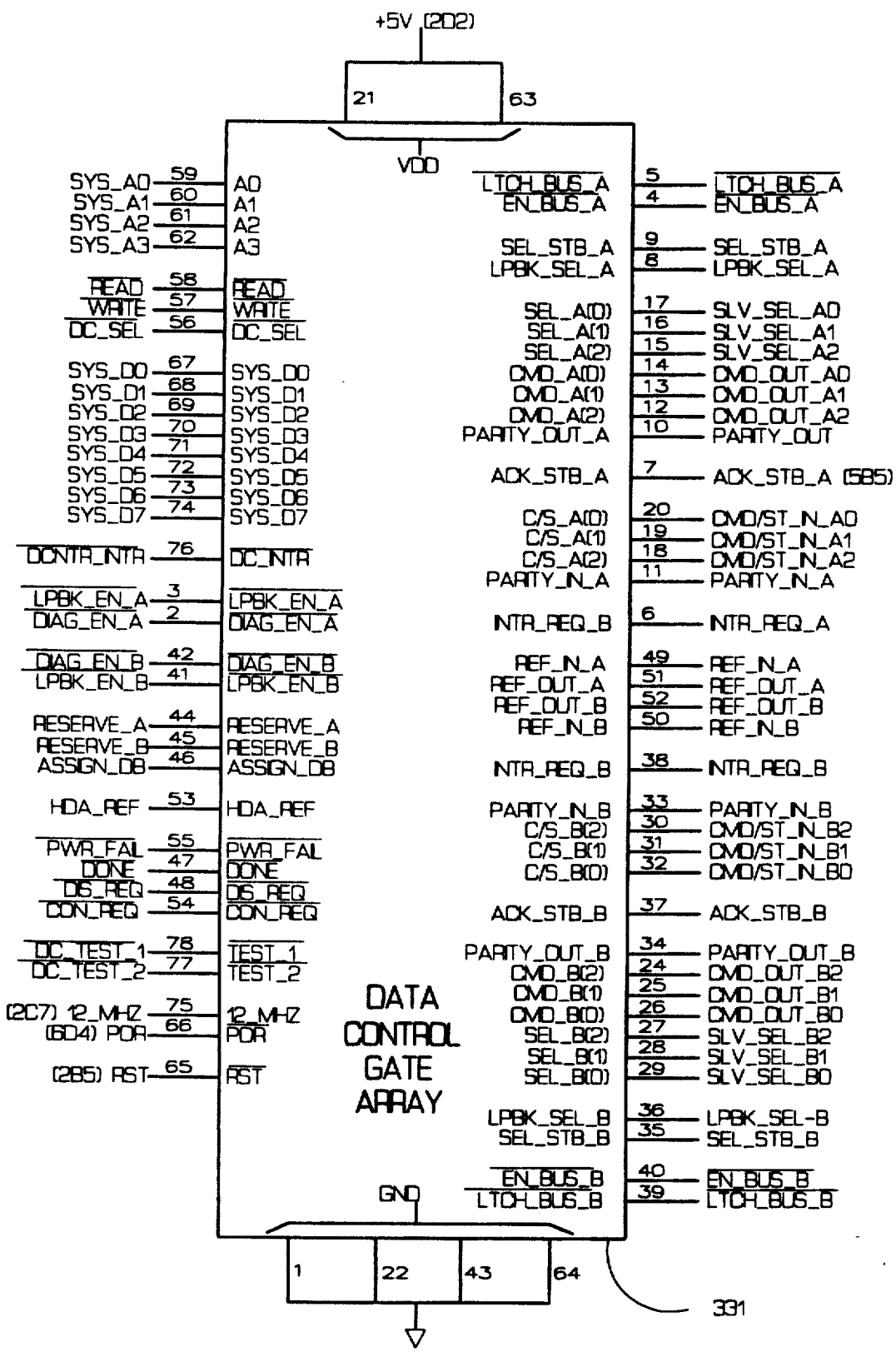
FIGS. 13(a) through 13(g) is a schematic diagram of the I/O direct control interface section shown in FIG. 2.
Figure 13B:
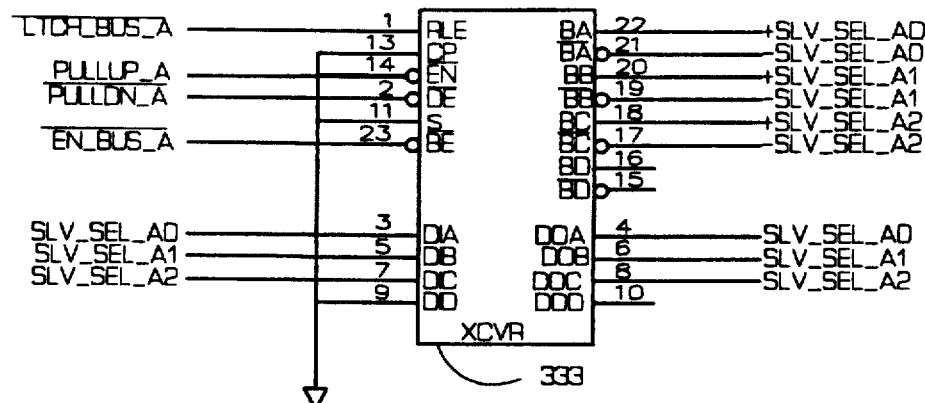
Figure 13C:
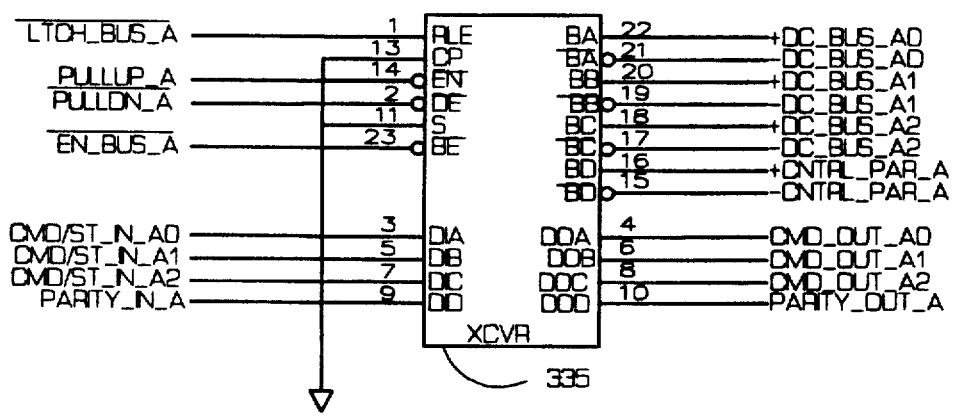
Figure 13D:
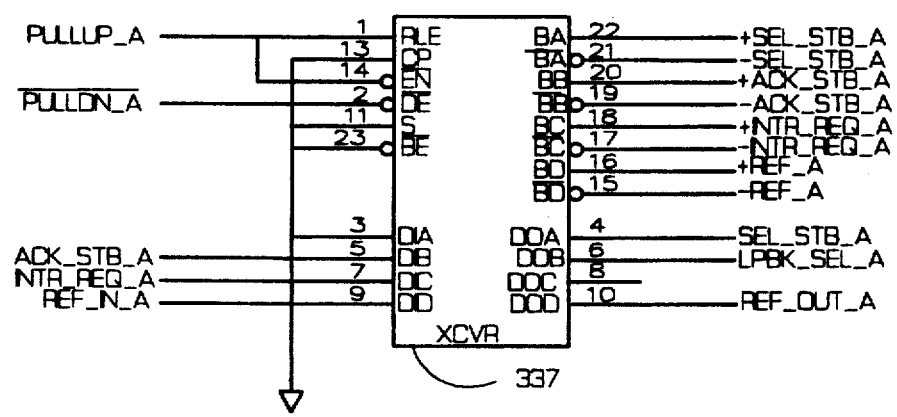
Figure 13E:
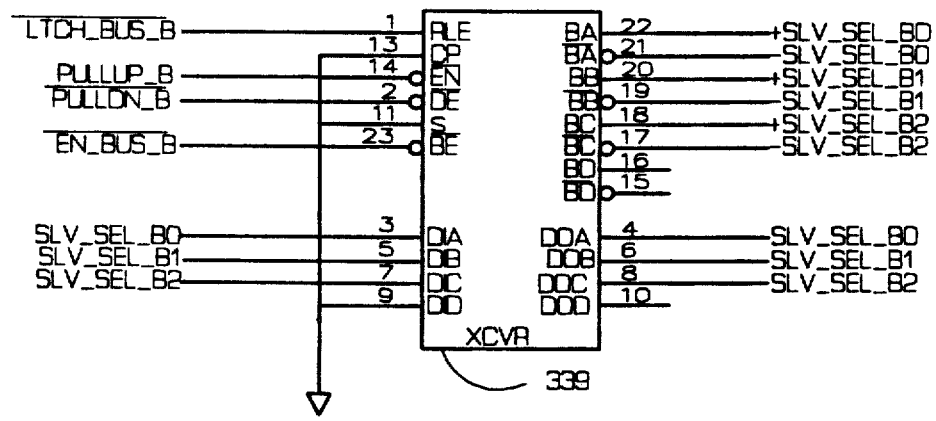
Figure 13F:
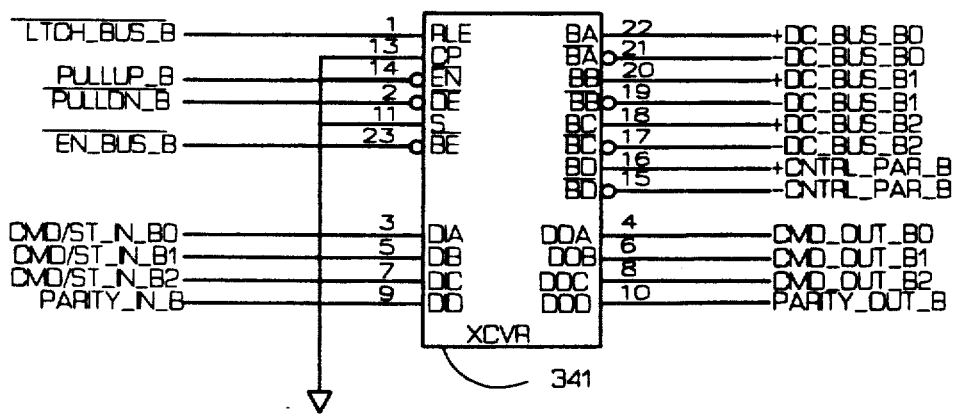
Figure 13G:
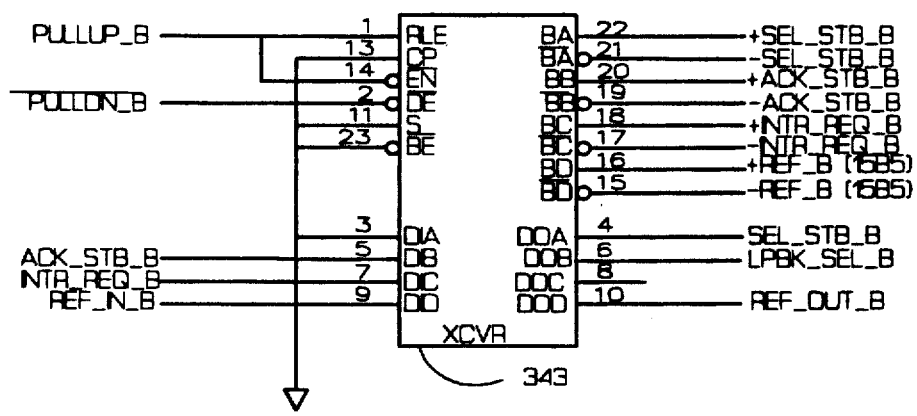

As can be seen, the controller command section interface 19-5 which is shown in FIG. 4 and FIG. 5 includes a differential transceiver 201 and a buffer 203. Buffer 203 is used for diagnostic purposes. The section further includes a controller 205 which may be in the form of a Signetics chip number SCN 68652. Controller 205 formats, transmits and receiving synchronous serial data while supporting bit or byte oriented protocal. The chip is interfaced to the microprocessor 19-2 in controller 19.

The controller data section interface 19-4, which is shown in FIGS. 6(a) through 8(d), includes a buffer 207 which buffers the second byte of a word transferred over Data Section 27 to the data FIFO's. An octal transparent latch 209 and a Nand gate 211, which is inverted by an inverter 2134 to be an AND gate, store the first byte of a word transferred over the data section for storage in the data FIFO's. A set of NAND and OR gates 215 are used to generate a generic data strobe for use in clocking a data sequencer. An FPLS 215 monitors and generates parity for a plurality of data FIFOS to be described later. An FPLA 219 is used to generate basic control signals for the data section. A pair of flip-flops 221 and 223 are used to differentiate between the two bytes that make up a word transfer over the data section. A flip-flop 225 and AND gate 227 are used to generate the data strobe signal for transmitting data to the I/O device. Flip-flop 229 and gates 231 and 233 are used to control a clock used for direct control state matching diagnostic purposes. A pair of OR gates 235 and 237 are used to enable the appropriate byte of data from the FIFO'S to the data transceivers.

An octal register 239 is used to store the second byte of a word to be transferred to the I/O device over the data section while the first byte is being so transferred. A buffer 241 buffers the first byte of a word to be transferred to the I/O device over the data section to the data transceivers.

A pair of differential transceivers 243 and 245 are used to transmit and receive data in the data section. As set of three gates 247, 249 and 251 are used to generate the suspend control signal for the data section. A differential transceiver 253 is the bus transceiver for the data section control signal as well as the Interrupt signal from the I/O devices. A set of gates 255, 257, 259 and 261 are used to generate the Suspend control signal for the data section.

The controller direct control section interface 19-6, which is shown in FIGS. 9(a) through 10(c), includes an octal register 263 and an AND gate 265 which are used to store the response of any I/O device to an interrupt query command, a comparator 267 and a gate 269 which are used to check the echo'd direct control command from the I/O device for validity, and an FLPS 273 and a NAND gate 275, which control a single direct control cycle. They are triggered by FLPS 277 and handle all of the appropriate timing and error checking. FLPS controls whether a command is issued to one or more I/O devices. If a PAL 279 indicates an interrupt query command, all devices for which IQMASK is valid will receive the command until one responds. Comparator 271 checks the echo'd Direct Command from the I/O device for validity. Octal transparent latch 281 is used to save the command furnished to the Direct Control Section by the controller's microprocessor. Inverter 283 is connected to latch 281. A parity generator/checker 285, a JK flip-flop 287 connected to an inverter 289 and an AND gate 291 are used to generate the check parity on all direct control commands. Signals are transmitted to and from the controller direct control interface section through three differential transceivers 293, 295 and 297. The section also includes an inverter 298.

The I/O device command section interface 15-108, which is shown in FIGS. 11(a) through 11(e), includes a microprocessor 299, a pair of multiplexers 301 and 303 and a pair of transceivers 305 and 307. A pair of gates 309 and 311 are connected to multiplexor 301 and a pair of gates 315 and 317 are connected to multliplexor 303.

The I/O device data section interface 15-107, which is shown in FIGS. 12(a) through 12(f) includes a data path gate array 319 and five transceivers 321, 323, 325, 327 and 329.

The I/O device direct control section interface 15-109, which is shown in FIGS. 13(a) through 13(g) includes a direct control gate array 331 and six transceivers 333, 335, 337, 339, 341 and 343.

Figure 14:
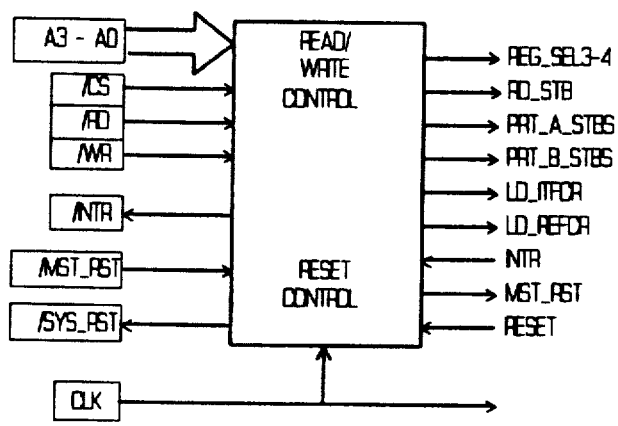
FIG. 14 is a block diagram of the gate arrays shown in FIGS. 12 and 13, respectively.
Figure 14:
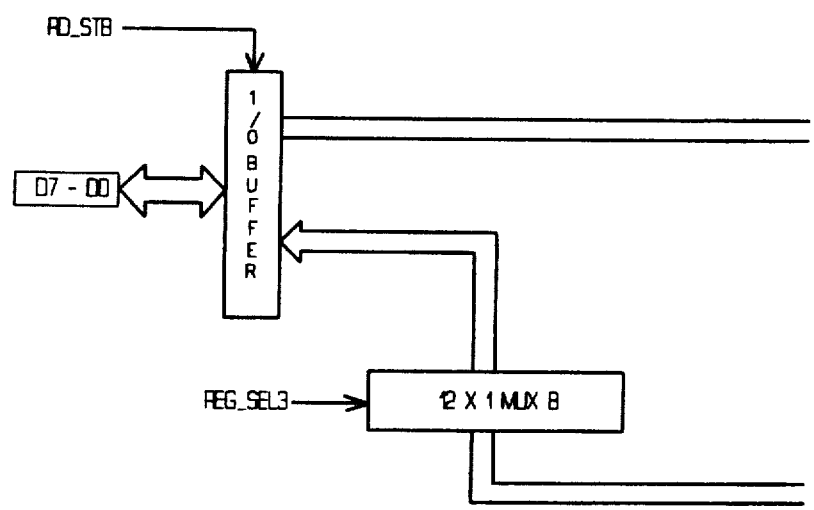
Figure 14:
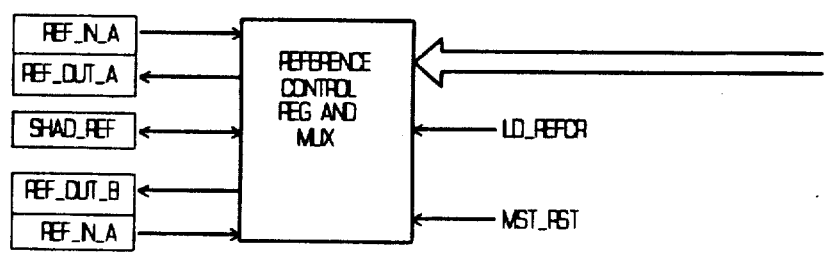
Figure 14:
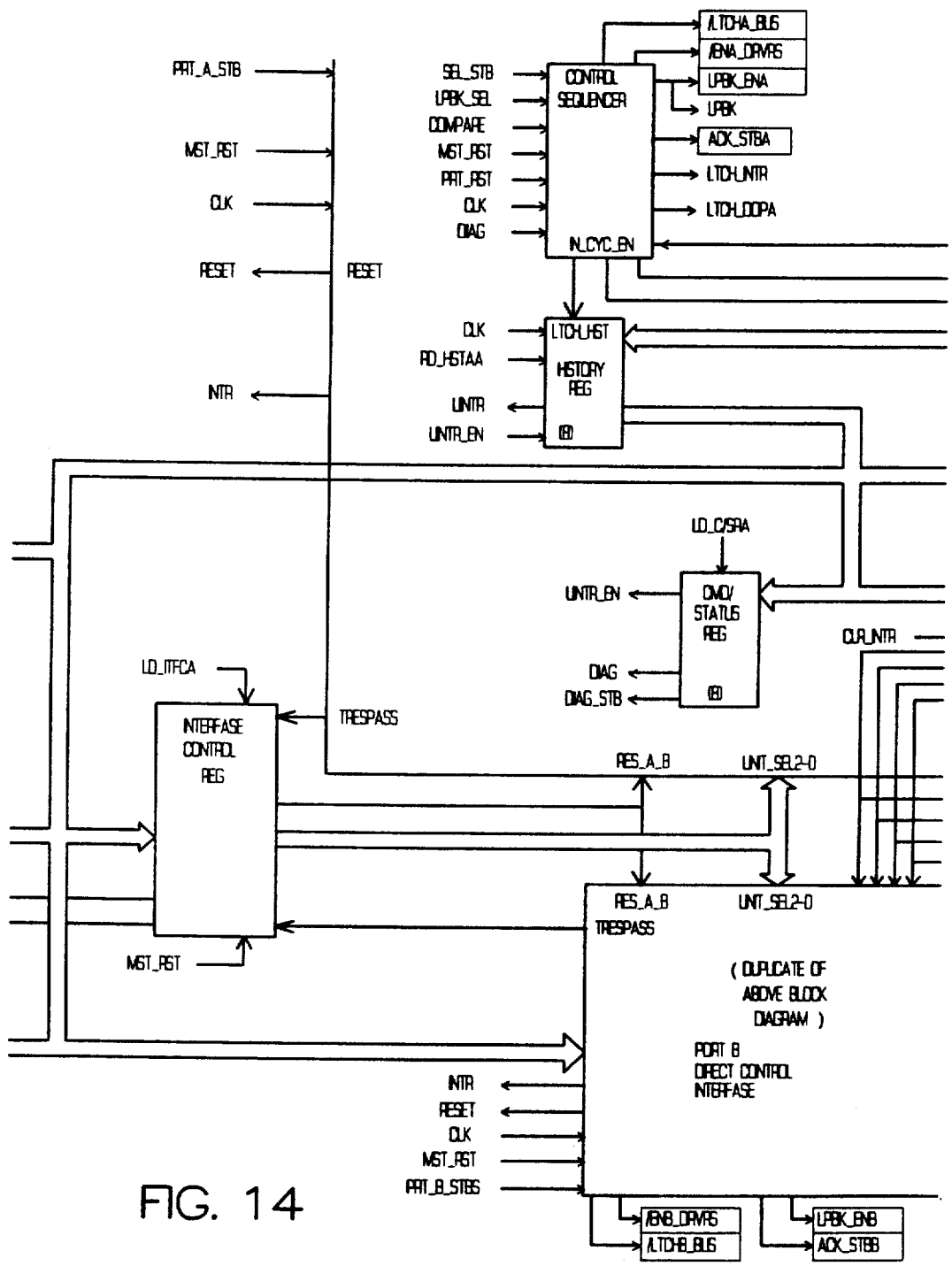
Figure 14:
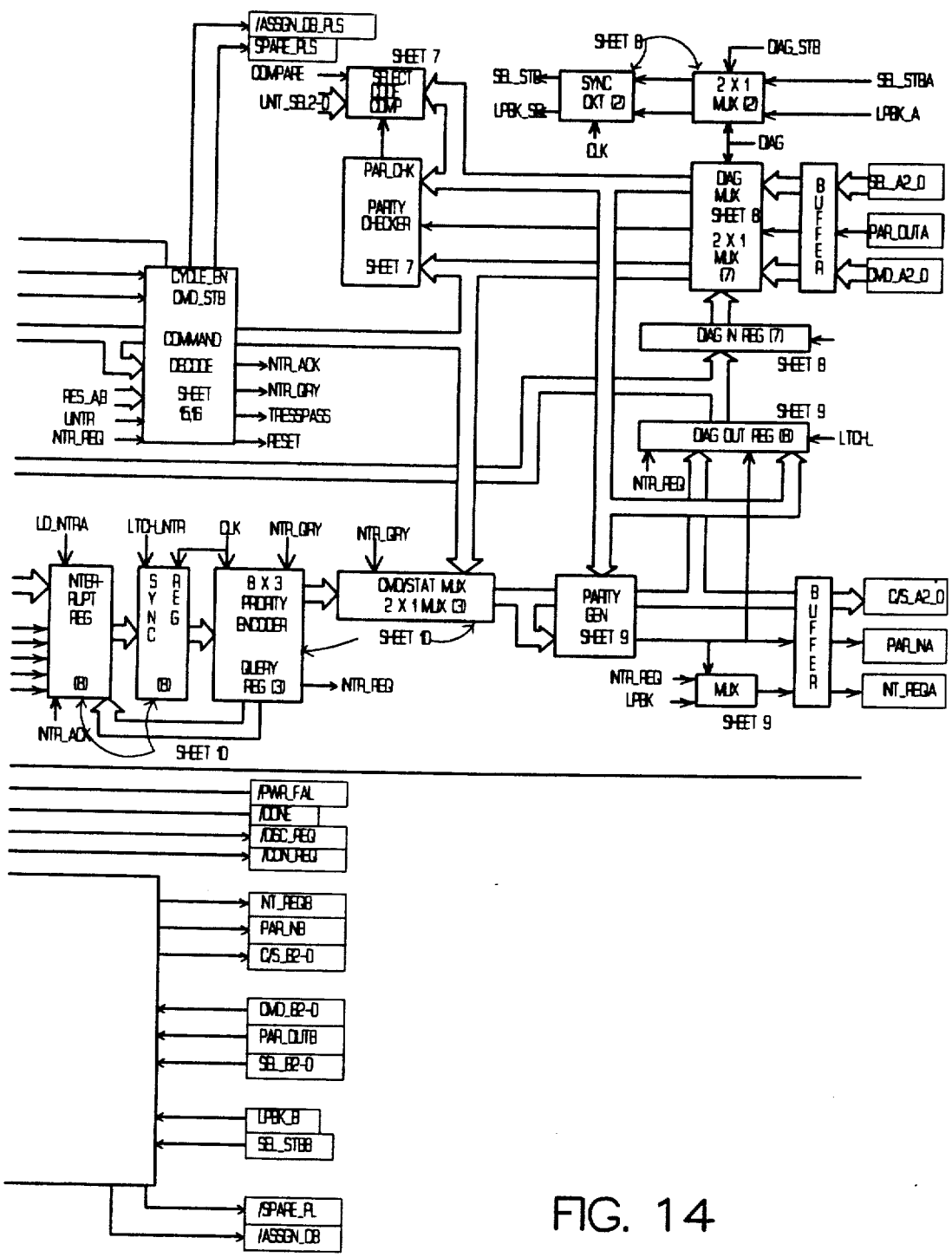

Gate array 319 is shown in block diagram form in FIG. 14.

The embodiment of the present invention described above is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:
1. A data processing system comprising:
 a. a host computer, said host computer including a controller;
 b. an intelligent mass storage input-output device, and
 c. an input-output interface bus for connecting said controller in said host computer to said intelligent mass-storage input-output device, said input-output interface bus being divided into three parallel sections, each section being used to transmit information, each section transmitting information independently of the information transmitted over the other two sections, said three sections being a data section, a command section and a direct control section, d. said controller including interface means for interfacing said host computer to said input-output interface bus, e. said intelligent mass-storage input-output device including interface means for interfacing said intelligent mass storage input-output device to said input-output interface bus, f. whereby information can be transmitted over one section of said input-output interface bus independent of the information transmitted over the other two sections during operation of the data processing system.

2. The data processing system of claim 1 and further including a second intelligent mass storage input-output device connected to said input-output interface bus in parallel with said other intelligent mass storage input-output device.

3. The data processing system of claim 1 and wherein said controller includes interface means for interfacing said host computer to said input-output interface bus and said intelligent mass-storage input-output device includes interface means for interfacing said intelligent mass-storage input-overput device to said input-output interface bus.

4. The data processing system of claim 3 and wherein the three sections in said input-output interface bus are a data section, a command section and a direct control section.

5. The data processing system of claim 4 and wherein said data section in said input-output interface bus comprises an 8 bit wide data bus, a 1 bit data strobe line and a 1 bit data suspend line.

6. The data processing system of claim 5 and wherein said control section in said input-output interface bus comprises a 3 bit slave select bus, a 3 bit direct control bus, a 1 bit control parity line, a 1 bit slave select strobe line a 1 bit acknowledge line and a 1 bit interupt request line.

7. The data processing system of claim 6 and wherein said command section in said input-output interface bus comprises a 3 bit slave select bus, a 3 bit direct control bus, a 1 bit control parity line, a 1 bit slave select strobe line a 1 bit acknowledge line and a 1 bit interupt request line a 1 bit command line, a 1 bit command clock line, a 1 bit status line and a 1 bit status clock line.

8. The data processing system of claim 4 and wherein said interface means in said controller includes a command section interface, a data section interface, a direct control section interface, a microprocessor, a memory, a data buffer and a burst multiplexer channel interface control.

9. The data processing system of claim 8 and wherein said interface means in said controller further includes a microprocessor.

10. The data processing system of claim 9 and wherein said interface means further includes a memory, a burst multiplexer channel interface and a data buffer.

11. The data processing system of claim 9 and wherein said command section interface is coupled to said command section in said input-output interface bus.

12. The data processing system of claim 11 and wherein said interface means in said intelligent mass-storage input-output device includes a command section interface, a direct control section interface, a data path section interface, a microprocessor, a microprocessor memory, a data path RAM and three buffers, one buffer being coupled to each interface section.

13. The data processing system of claim 12 and wherein said interface means in said intelligent mass-storage input-output device includes a microprocessor and a microprocessor memory.

* * * * *